(12) United States Patent
Kudo

(10) Patent No.: US 11,938,935 B2
(45) Date of Patent: Mar. 26, 2024

(54) VEHICLE DRIVING CONTROL APPARATUS

(71) Applicant: SUBARU CORPORATION, Tokyo (JP)

(72) Inventor: Shinya Kudo, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 205 days.

(21) Appl. No.: 17/691,500

(22) Filed: Mar. 10, 2022

(65) Prior Publication Data

US 2022/0306102 A1 Sep. 29, 2022

(30) Foreign Application Priority Data

Mar. 26, 2021 (JP) ................................ 2021-053868

(51) Int. Cl.
| | |
|---|---|
| *B60W 30/16* | (2020.01) |
| *B60W 30/12* | (2020.01) |
| *B60W 30/14* | (2006.01) |
| *B60W 30/18* | (2012.01) |
| *B60W 50/10* | (2012.01) |

(52) U.S. Cl.
CPC .......... *B60W 30/143* (2013.01); *B60W 30/12* (2013.01); *B60W 30/162* (2013.01); *B60W 30/18163* (2013.01); *B60W 50/10* (2013.01); *B60W 2554/80* (2020.02); *B60W 2555/60* (2020.02)

(58) Field of Classification Search
CPC ............... B60W 30/143; B60W 30/12; B60W 30/18163; B60W 50/10; B60W 2555/60; B60W 2554/80; B60W 30/16; B60W 30/162
See application file for complete search history.

(56) References Cited

U.S. PATENT DOCUMENTS

2019/0092327 A1* 3/2019 Osaki .................... B60W 30/16

FOREIGN PATENT DOCUMENTS

| JP | 2009-184464 A | 8/2009 |
|---|---|---|
| JP | 2019-59360 A | 4/2019 |

* cited by examiner

*Primary Examiner* — Jacob M Amick
(74) *Attorney, Agent, or Firm* — TROUTMAN PEPPER HAMILTON SANDERS LLP

(57) ABSTRACT

A vehicle driving control apparatus applied to a vehicle includes a surrounding environment information obtaining device, a vehicle situation information obtaining device, an external information receiving device, a velocity value setter, and a driving control unit. The driving control unit adjusts a velocity of the vehicle by considering surrounding vehicles and various information and performs driving control based on the adjusted velocity. If a leading vehicle is recognized, the velocity of the vehicle exceeds a speed limit or a predetermined velocity, a driver set velocity is not lower than a velocity of the leading vehicle, and a following vehicle is not recognized for a predetermined time or longer, the driving control unit sets a temporary velocity as the velocity of the vehicle and performs driving control by using the temporary velocity. The temporary velocity is lower than the velocity of the leading vehicle by a preset value.

6 Claims, 8 Drawing Sheets

VEHICLE DRIVING CONTROL APPARATUS

CROSS-REFERENCE TO RELATED APPLICATIONS

The present application claims priority from Japanese Patent Application No. 2021-053868 filed on Mar. 26, 2021, the entire contents of which are hereby incorporated by reference.

BACKGROUND

The disclosure relates to a driving control apparatus that performs driving control for a vehicle by taking surrounding vehicles into consideration.

The development of a self-driving control technology for autonomously driving a vehicle, such as an automobile, without the intervention of a human driver is in progress. Meanwhile, to lessen the burden of a driver and also to improve driving safety, driver-assistance driving control apparatuses employing the self-driving control technology have been variously proposed and are being put to practical use.

For example, a known driving control apparatus includes a surrounding environment recognition device with autonomous sensor units, such as a camera, a radar, and sound navigation and ranging (sonar). This type of driving control apparatus identifies other vehicles around a subject vehicle, such as a leading vehicle, a following vehicle, and a vehicle driving along the subject vehicle, by using these autonomous sensor units. As this type of control apparatus, various driving control apparatuses having an active lane keeping (ALK) control function and a cruise control function with a vehicle-to-vehicle distance control function (adaptive cruise control (ACC) function) have been proposed and are being put to practical use. The ALK control function is a function to make a vehicle drive along a target driving path set within a driving lane. The ACC control function is the following function. While a subject vehicle is controlled to drive in accordance with a target vehicle velocity set by a driver, if a leading vehicle is detected, the subject vehicle is controlled to follow the leading vehicle by maintaining a certain distance with the leading vehicle. Examples of such driving control apparatuses are disclosed in Japanese Unexamined Patent Application Publication (JP-A) Nos. 2009-184464 and 2019-59360.

The driving control apparatus disclosed in JP-A No. 2009-184464 performs ACC control in the following manner. If the velocity of a subject vehicle is found to be lower than or equal to the speed limit of a driving road, the driving control apparatus sets the upper limit value of the ACC function to the speed limit. If the velocity of the subject vehicle is found to exceed the speed limit, the driving control apparatus sets the upper limit value of the ACC function to the velocity of the subject vehicle.

The driving control apparatus disclosed in JP-A No. 2019-59360 performs ACC control in the following manner. The driving control apparatus suitably sets the degree of acceleration or deceleration used for increasing or decreasing the velocity of a subject vehicle until a speed limit, in accordance with the distance between the subject vehicle and another vehicle (such as a leading vehicle or a following vehicle) and the relative velocity of the subject vehicle.

SUMMARY

An aspect of the disclosure provides a vehicle driving control apparatus to be applied to a vehicle. The vehicle driving control apparatus includes a surrounding environment information obtaining device, a vehicle situation information obtaining device, an external information receiving device, a velocity value setter, and a driving control unit. The surrounding environment information obtaining device is configured to obtain surrounding environment information on an environment around the vehicle. The vehicle situation information obtaining device is configured to obtain vehicle situation information on a situation of the vehicle. The external information receiving device is configured to receive at least roadmap information from an external device. The velocity value setter is configured to set a target velocity value of the vehicle to be used for performing driving control. The driving control unit is configured to adjust a velocity value of the vehicle by considering one or more surrounding vehicles around the vehicle, based on items of information including the surrounding environment information obtained by the surrounding environment information obtaining device, the vehicle situation information obtained by the vehicle situation information obtaining device, and the roadmap information obtained by the external information receiving device. The driving control unit is configured to perform driving control based on the adjusted velocity value of the vehicle. In a case where: a leading vehicle ahead of the vehicle is recognized; the velocity value of the vehicle exceeds a speed limit value of a driving road of the vehicle or a predetermined velocity value determined by adding or subtracting a certain value to or from the speed limit value; a driver set velocity value set by a driver who dives the vehicle is higher than or equal to a velocity value of the leading vehicle; and a following vehicle behind the vehicle has not been recognized for a predetermined time or longer, the driving control unit is configured to set a temporary velocity value as the velocity value of the vehicle and to perform driving control by using the temporary velocity value. The temporary velocity value is lower than the velocity value of the leading vehicle by a preset value.

An aspect of the disclosure provides a vehicle driving control apparatus to be applied to a vehicle, the vehicle driving control apparatus includes a first sensor, a second sensor and circuitry. The first sensor is configured to obtain surrounding environment information on an environment around the vehicle. The second sensor is configured to obtain vehicle situation information on a situation of the vehicle. The circuitry is configured to receive at least roadmap information from an external device. The circuitry is configured to set a target velocity value of the vehicle to be used for performing driving control. The circuitry is configured to adjust a velocity value of the vehicle by considering one or more surrounding vehicles around the vehicle, based on items of information including the surrounding environment information, the vehicle situation information, and the roadmap information. The circuitry is configured to perform driving control based on the adjusted velocity value of the vehicle. In a case where: a leading vehicle ahead of the vehicle is recognized; the velocity value of the vehicle exceeds a speed limit value of a driving road of the vehicle or a predetermined velocity value determined by adding or subtracting a certain value to or from the speed limit value; a driver set velocity value set by a driver who drives the vehicle is higher than or equal to a velocity value of the leading vehicle; and a following vehicle behind the vehicle has not been recognized for a predetermined time or longer, the circuitry is configured to set a temporary velocity value as the velocity value of the vehicle and perform driving control by using the temporary velocity value. The temporary velocity value is lower than the velocity value of the leading vehicle by a preset value.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

Figure 1:
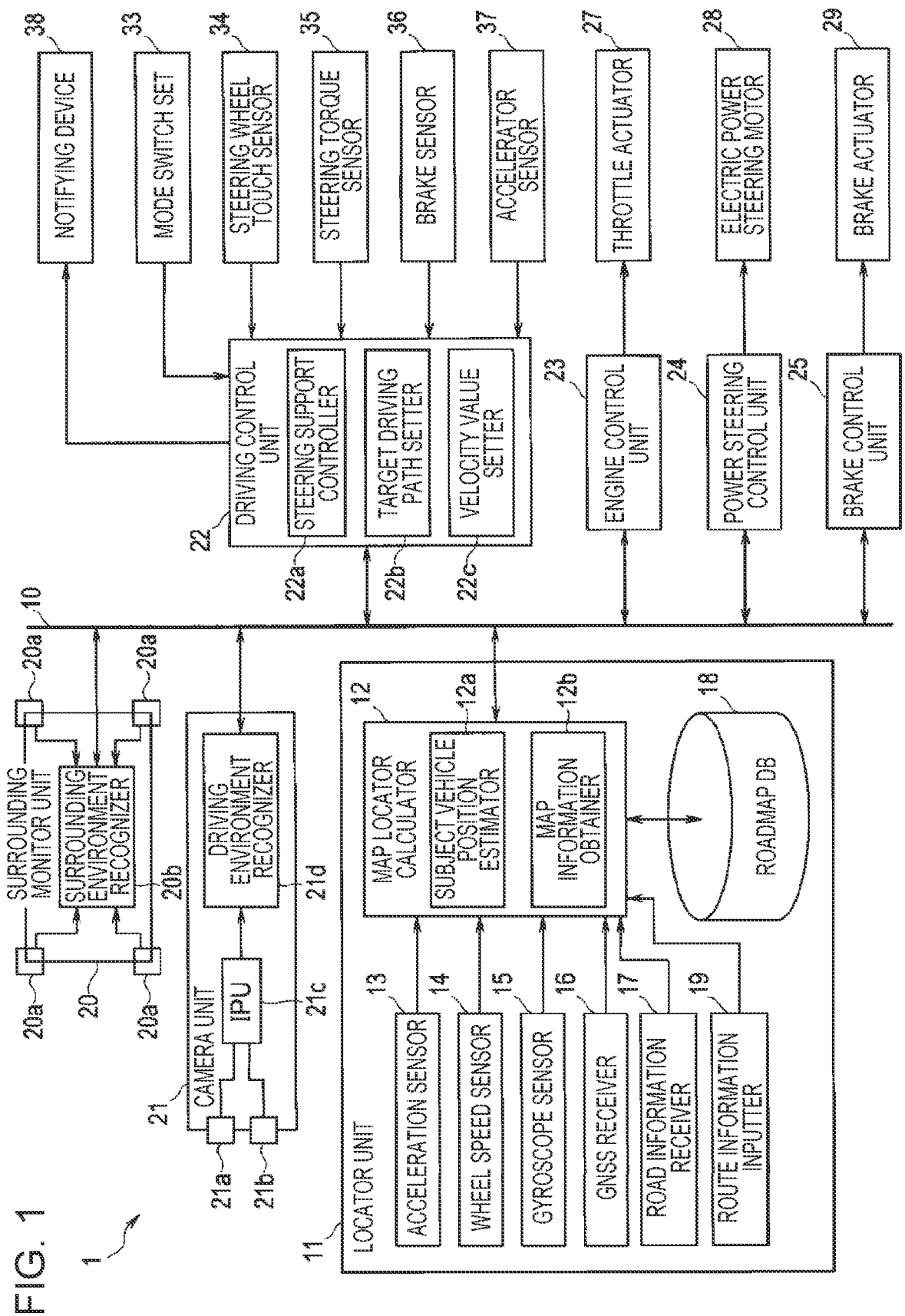
FIG. 1 is a block diagram illustrating an example of the schematic configuration of a driving control apparatus according to an embodiment of the disclosure.

Basically, driving control apparatuses of the related art, such as those disclosed in JP-A Nos. 2009-184464 and 2019-59360, perform control to set the velocity of a subject vehicle in accordance with the distance between the subject vehicle and a surrounding vehicle and the relative velocity of the subject vehicle. According to this control operation, the behavior (such as the velocity and the acceleration and deceleration) of the subject vehicle is influenced by the behavior of another vehicle.

If another vehicle behaves unstably (for example, if it does not drive at a constant velocity or repeatedly accelerates and decelerates), the behavior of the subject vehicle may also become unstable. If the subject vehicle unnaturally accelerates and decelerates, for example, it may suffer from unfavorable results, such as poor ride comfort and a lower fuel consumption rate. Additionally, if the subject vehicle continues driving by following a vehicle which is behaving unstably, it may fail to maintain safe driving.

It is desirable to provide a driving control apparatus that can offer good ride comfort and also contribute to improving the fuel consumption rate and to maintaining safe driving while performing control for a vehicle by considering surrounding other vehicles.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. Throughout the present specification and the drawings, elements having substantially the same function and configuration are denoted with the same numerals to avoid any redundant description. To illustrate the individual elements large enough to be identified in the drawings, the dimensional relationship between members of an element and a reduced scale of the members may be different among the elements. In the disclosure, therefore, the number and the shape of each element and the dimensional ratio and relative positional relationship between the elements are not limited to those illustrated in the drawings.

A driving control apparatus according to an embodiment is installed in or on a subject vehicle, such as an automobile, and performs driving control for assisting a driver in driving the subject vehicle. The driving control apparatus obtains information regarding environments ahead of and around the subject vehicle by using sensing devices, such as an in-vehicle camera unit and a radar device. The above-described environment information concerns, for example: moving bodies ahead of or around the subject vehicle, such as other vehicles (leading vehicles, following vehicles, vehicles driving in the opposite direction (hereinafter such vehicles may also be called oncoming vehicles), and vehicles driving along the subject vehicle in the same direction (hereinafter such vehicles may also be called side vehicles)), bicycles, and pedestrians; buildings; various structures; obstacles; and other surrounding environments, such as the condition of a driving road of the subject vehicle. Hereinafter, such information will simply be called surrounding environment information.

In addition to the surrounding environment information, the driving control apparatus also obtains roadmap information from a high-definition roadmap database, for example, which is an external device, by performing communication. Based on the roadmap information, the driving control apparatus detects the road conditions including information on leading and following vehicles, various structures, and obstacles. The driving control apparatus suitably utilizes these items of information (such as the surrounding environment information, roadmap information, and other information) to execute driving control for assisting a driver.

The driving control apparatus of the embodiment at least performs active lane keeping (ALK) control and adaptive cruise control (ACC).

ALK control is a control function to make a vehicle drive along a target driving path set within a driving lane and continue driving safely while keeping this driving lane, based on various items of information, such as the surrounding environment information, obtained during driving.

ACC control is the following control function. While a subject vehicle is controlled to drive in accordance with a target vehicle velocity set by a driver, if a leading vehicle is detected, the velocity of the subject vehicle is raised or lowered in accordance with the velocity of the leading vehicle so that the subject vehicle can follow the leading vehicle by maintaining a certain distance with the leading vehicle.

While the subject vehicle is driving under ALK control and ACC control, if the driving control apparatus detects a surrounding vehicle near the subject vehicle, such as a leading vehicle, a following vehicle, or a side vehicle, it can switch to driving control reflecting the positional relationship between the subject vehicle and the surrounding vehicle.

This driving control is slightly different from ACC control which simply makes the subject vehicle follow a leading vehicle (hereinafter such ACC control will be called regular ACC control).

To put it simply, the driving control apparatus performs the following ACC control. The driving control apparatus increases the distance between the subject vehicle and a surrounding vehicle (or the relative distance of the subject vehicle to the surrounding vehicle) so as to allow the subject vehicle to drive almost alone. The subject vehicle is thus able to drive efficiently without being influenced by the behavior of the surrounding vehicle and also to drive safely. Hereinafter, such driving control will be called eco-ACC control.

In eco-ACC control, the driving control apparatus automatically sets a temporary target velocity value (may also be simply called a temporary velocity value) at a predetermined timing and performs driving control by using the temporary velocity value. This eco-ACC control reflects various items of information, such as the speed limit of a driving road, the velocity of a subject vehicle, the target velocity set by a driver of the subject vehicle, the velocity of a leading vehicle running in the same lane as the subject vehicle, as well as surrounding situations, such as the presence of a following vehicle running in the same lane as the subject vehicle, the velocity of this following vehicle, the presence of a following vehicle and/or a side vehicle in a left- or right-side lane next to the lane of the subject vehicle, the velocity of this following vehicle and/or that of this side vehicle, the behavior of the leading vehicle, and the traffic congestion of an opposite lane. The above-described target velocity set by a driver will be called a driver set velocity value, which will be discussed later.

If various conditions determined based on the surrounding situations, for example, are satisfied, the temporary velocity value is registered as a set velocity value. The driving control apparatus refers to this set velocity value when performing ACC control in the eco-ACC control mode. The velocity value registered as the set velocity value may be called a registered velocity value.

An example of the schematic configuration of a driving control apparatus 1 according to an embodiment will be described below with reference to the block diagram of FIG. 1.

The basic configuration of the driving control apparatus 1 of the embodiment is similar to that of a known driving control apparatus of the same type. The configuration of the driving control apparatus 1 will thus be explained mainly by referring to the elements related to the disclosure. The other elements of the driving control apparatus 1 are assumed to be similar to those of a known driving control apparatus, and a detailed explanation of the elements which are not directly related to the disclosure will be omitted. In FIG. 1, the major elements of the driving control apparatus 1 are illustrated, while the elements which are not directly related to the disclosure are not illustrated.

In the embodiment, a description will be given, assuming that a road system in which vehicles drive on the left side (hereinafter simply called the left-hand traffic road system) is employed. The embodiment is also applicable to a road system in which vehicles drive on the right side (hereinafter simply called the right-hand traffic road system) by merely reversing the left and right sides in the embodiment.

As illustrated in FIG. 1, the driving control apparatus 1 includes, as major units, a locator unit 11, a surrounding monitor unit 20, a camera unit 21, a driving control unit 22, an engine control unit 23, a power steering control unit 24, and a brake control unit 25. In one example, the driving control unit 22 may serve as a driving controller.

The locator unit 11, the surrounding monitor unit 20, the camera unit 21 are sensor units for detecting driving environments inside and outside of a subject vehicle and are units serving as environment recognizing devices. The locator unit 11, the surrounding monitor unit 20, the camera unit 21 are independent units without depending on each other.

The driving control unit 22, the engine control unit 23, the power steering control unit 24, and the brake control unit 25 are each coupled to the locator unit 11, the surrounding monitor unit 20, the camera unit 21 via an in-vehicle communication line 10, such as a controller area network (CAN), and share data with each other.

The locator unit 11 is an information obtaining device that estimates the position of the subject vehicle on a roadmap and also obtains roadmap information mainly on a roadmap ahead of the estimated position of the subject vehicle.

The locator unit 11 includes a map locator calculator 12, an acceleration sensor 13, a wheel speed sensor 14, a gyroscope sensor 15, a global navigation satellite system (GNSS) receiver 16, a road information receiver 17, a high-definition roadmap database (illustrated as roadmap DB in FIG. 1) 18, and a route information inputter 19. In one example, the high-definition roadmap database 18 serves as a map information storage.

The acceleration sensor 13, the wheel speed sensor 14, the gyroscope sensor 15 are sensors used for estimating the position of the subject vehicle. The acceleration sensor 13 detects the longitudinal acceleration of the subject vehicle. The wheel speed sensor 14 detects the rotational speeds of the forward left, forward right, rear left, and rear right wheels (if the subject vehicle is a four-wheel vehicle) of the subject vehicle. Based on the detection results of the wheel speed sensor 14, the velocity of the subject vehicle can be detected. The gyroscope sensor 15 detects the angular velocity or angular acceleration of the subject vehicle. The acceleration sensor 13, the wheel speed sensor 14, the gyroscope sensor 15 are autonomous driving sensors serving as driving state obtainers and are coupled to the input side of the map locator calculator 12.

The acceleration sensor 13, the wheel speed sensor 14, the gyroscope sensor 15 are sensors that enable the subject vehicle to drive autonomously in an environment, such as in a tunnel, where the GNSS receiver 16 (discussed later) is unable to effectively receive positioning signals from GNSS satellites (not illustrated) due to its lowered sensitivity. Other sensors, such as a vehicle velocity sensor and a yaw rate sensor, may be provided as autonomous driving sensors, though they are not illustrated.

The GNSS receiver 16, which serves as an obtainer that obtains information of the position of the subject vehicle, receives various items of information from the GNSS, for example. That is, the GNSS receiver 16 is a receiving device that receives positioning signals emitted from multiple positioning satellites. The GNSS receiver 16 then outputs the received positioning signals to the map locator calculator 12 of the locator unit 11. The map locator calculator 12 estimates the position of the subject vehicle (latitude and longitude) based on the positioning signals output from the GNSS receiver 16. To output the positioning signals to the map locator calculator 12, the GNSS receiver 16 is located on the input side of the map locator calculator 12.

In addition to the GNSS receiver 16, the road information receiver 17, the high-definition roadmap database 18, which serves as a storage, and the route information inputter 19 are coupled to the input side of the map locator calculator 12.

The road information receiver 17 receives various items of information, such as map information and information used for autonomous driving, stored in a cloud server (not illustrated) coupled to the driving control apparatus 1 via a predetermined base station (not illustrated) or the internet. In one example, the road information receiver 17 may serve as an external information receiving device. The road information receiver 17 outputs the obtained various items of information to the map locator calculator 12. The road information receiver 17 may be formed as a road information sending/receiving device having a function of sending various items of information on the subject vehicle to the base station or a cloud server (not illustrated).

The map locator calculator 12 performs map matching to match the position of the subject vehicle onto the roadmap, based on various items of information, such as the map information received by the road information receiver 17. The map locator calculator 12 also constructs a target driving route which links the position of the subject vehicle to a destination input via the route information inputter 19 (discussed later). On the constructed target driving route, the map locator calculator 12 sets a driving route for a self-driving zone, which is used for enabling the subject vehicle to drive autonomously, in a range of several kilometers ahead of the subject vehicle. The following items of information, for example, are set as the driving route for the self-driving zone: a lane to be used by the subject vehicle (for example, in which one of three lanes the subject vehicle is to drive when the subject vehicle drives on a three-lane road); and information about the overtaking of a leading vehicle by the subject vehicle, such as a timing at which the subject vehicle starts changing lanes to overtake a leading vehicle.

The high-definition roadmap database 18 is basically constituted by a large-capacity storage medium, such as a hard disk drive (HDD) and a solid state drive (SSD). In the high-definition roadmap database 18, high-definition roadmap information (local dynamic map), which is already known, is stored. The high-definition roadmap information has the same layer structure as a global dynamic map stored in a cloud server (not illustrated), for example. This layer structure is a hierarchical structure in which information, such as additional map information, for supporting autonomous driving is superimposed on a static information layer, which is the bottommost layer serving as the base of the hierarchical structure.

The additional map information includes static position information and dynamic position information. Examples of the static position information are road types (a local road and a highway, for example), the shapes of roads, left and right marking lines (such as center line, edge lines, and lane lines), the exits of highways and bypasses, the lengths (start and end positions) of branch lanes and merge lanes leading to road junctions, and rest areas or service areas. Examples of the dynamic position information are the traffic congestion state and traffic restrictions due to accidents or road work.

When the map locator calculator 12 has set a target driving route, the additional map information is continuously obtained from the global dynamic map and is updated when necessary. The additional map information is used as surrounding information for allowing the subject vehicle to drive autonomously along the target driving route.

The high-definition roadmap information includes lane data regarding each lane used for autonomous driving. Examples of the lane data are the lane width, coordinates of the position of the lane center, azimuth angle in the traveling direction, and speed limit. The lane data and other information regarding each lane are stored on a roadmap at intervals of several meters.

The route information inputter 19 is a terminal device operated by a driver or a passenger of the subject vehicle. Using the route information inputter 19 allows a user to input various items of information (for example, a destination and stop points, such as rest areas on a highway or motorway service areas) together to be used for the map locator calculator 12 to set a target driving route.

Examples of the route information inputter 19 are an input unit of a car navigation system (such as a monitor touchscreen), a mobile terminal (such as a smartphone), and a personal computer. The route information inputter 19 is coupled to the map locator calculator 12 via a wired or wireless medium. A driver or a passenger inputs information on a destination and stop points (such as the name, address, and telephone number of a facility) using the route information inputter 19, and the input information is read into the map locator calculator 12. The map locator calculator 12 then sets the coordinates (latitude and longitude) of the position of each of the destination and the stop positions.

The map locator calculator 12 includes a subject vehicle position estimator 12*a* and a map information obtainer 12*b*.

The subject vehicle position estimator 12*a* is an element having a function of estimating the position of the subject vehicle. The subject vehicle position estimator 12*a* determines the coordinates (latitude and longitude) of the position of the vehicle, based on the positioning signals received by the GNSS receiver 16. The subject vehicle position estimator 12*a* then performs map matching to match the determined coordinates onto the roadmap indicated by route map information so as to estimate the current position of the subject vehicle on the roadmap.

In an environment, such as in a tunnel, where the GNSS receiver 16 is unable to effectively receive positioning signals from positioning satellites due to its lowered sensitivity, the subject vehicle position estimator 12*a* switches to dead reckoning navigation to estimate the position (latitude and longitude) of the subject vehicle, based on various items of data, such as vehicle velocity data determined from the wheel speeds detected by the wheel speed sensor 14, angular velocity data detected by the gyroscope sensor 15, and longitudinal acceleration data detected by the acceleration sensor 13.

The map information obtainer 12*b* constructs target driving route information on a target driving route from the current position to a destination in accordance with preset route conditions (such as the recommended route and quickest route). The map information obtainer 12*b* constructs the target driving route information, based on the position (latitude and longitude) of the subject vehicle estimated by the subject vehicle position estimator 12*a* and position information (latitude and longitude) on the destination and stop points input by a driver or a passenger using the route information inputter 19. The target driving route information indicates a target driving route which links the position of the subject vehicle to the destination (if a stop point is set, the destination via this stop point) on the roadmap indicated by the high-definition roadmap information. Meanwhile, the subject vehicle position estimator 12*a* identifies the lane in which the subject vehicle is driving, determines the shapes of roads, such as those of the identified lane and merge lanes, stored in the roadmap data, and sequentially stores the identified and determined information. The map information obtainer 12*b* sends the target driving route information to the subject vehicle position estimator 12*a*.

In this manner, the map locator calculator 12 performs map matching to match the position of the subject vehicle estimated by the subject vehicle position estimator 12*a* onto the roadmap so as to specify the current position of the subject vehicle, and obtains roadmap information including information about the situations around the position of the subject vehicle. The map locator calculator 12 also sets a target driving route of the subject vehicle by using the map information obtainer 12*b*.

The camera unit 21 recognizes environments mainly in the traveling direction (ahead) of the subject vehicle and obtains the recognized environments as image information. In one example, the camera unit 21 may serve as a surrounding environment information obtaining device and form part of a surrounding environment recognition device.

The camera unit 21 recognizes various surrounding road environments. For example, the camera unit 21 recognizes objects including moving bodies, such as other vehicles driving in front of and in the front left and right sides of the subject vehicle (such as leading vehicles, oncoming vehicles, and side vehicles), bicycles and motorcycles running along the subject vehicle, traffic light display state (such as the lighting color, blinking state, and light arrow direction), road signs, road markings, such as stop lines and marking lines (center line, edge lines, and lane lines, for example), road surface conditions (such as the shape, size, and the presence of a puddle).

The camera unit 21 is fixed at a certain position inside the subject vehicle, such as the center of the top front side. The camera unit 21 includes in-vehicle cameras (stereo cameras), such as a main camera 21*a* and a sub-camera 21*b*, an image processing unit (IPU) 21*c*, and a driving environment recognizer 21*d*. The main camera 21*a* and the sub-camera 21*b* are disposed at horizontally symmetrical positions along the width of the subject vehicle. The main camera 21*a* and the sub-camera 21*b* each serve as an image obtaining device.

The camera unit 21 takes a reference image as reference image data by using the main camera 21*a*, and takes a comparison image as comparison image data by using the sub-camera 21*b*. The reference image data and the comparison image data respectively obtained by the main camera 21*a* and the sub-camera 21*b* are subjected to predetermined image processing using the IPU 21*c*.

The driving environment recognizer 21*d* reads the reference image data and the comparison image data subjected to image processing executed by the IPU 21*c* and recognizes the same object in the two images based on the parallax. By utilizing the principle of triangulation, the driving environment recognizer 21*d* calculates the distance from the subject vehicle to the recognized object, which will be called distance information, based on the positional disparity of the object between the two images. The driving environment recognizer 21*d* also generates forward-direction driving environment image information (distance image information) including the above-described distance information.

Based on the generated distance image information and other information, the driving environment recognizer 21*d* recognizes, as surrounding environment information, various road markings including marking lines (such as center line, edge lines, and lane lines) on the left and right sides of the driving lane of the subject vehicle. In this sense, the driving environment recognizer 21*d* serves as a marking line detector that detects marking lines of the driving lane of the subject vehicle.

The driving environment recognizer 21*d* also determines the road curvature [1/m] at the center of the driving lane of the subject vehicle between the left and right marking lines (such as the lane lines) and also determines the width (lane width) between the left and right marking lines.

Various methods are known to determine the lane width and the road curvature at the center of a lane between the marking lines. For example, based on the forward-direction driving environment image information, the driving environment recognizer 21*d* recognizes the left and right marking lines by executing binarizing processing using the differences of the luminance levels, and finds the curvature of every predetermined zone of each of the left and right marking lines by using a curve approximation expression based on the least square method. The driving environment recognizer 21*d* then calculates the lane width from the difference in the curvature between the left and right marking lines. The driving environment recognizer 21*d* then calculates the road curvature at the center of the driving lane of the subject vehicle, based on the lane width and the curvature of each of the left and right marking lines.

The driving environment recognizer 21*d* also performs predetermined pattern matching on the distance image information so as to recognize guardrails, curbs, and various other objects (such as pedestrians, two-wheeled vehicles, and other vehicles around the subject vehicle) along the road. In one example, for each object, the driving environment recognizer 21*d* recognizes the type of object, distance to the object, moving velocity of the object, and relative velocity of the object to the subject vehicle, for example.

In addition to the main camera 21*a* and the sub-camera 21*b*, the camera unit 21 may include a rear camera (not illustrated), which also serves as an image obtaining device, for recognizing a vehicle (such as a following vehicle) driving behind the subject vehicle. The rear camera is installed at a position facing the area behind the subject vehicle and mainly obtains backward images of the subject vehicle. With this configuration, the camera unit 21 can identify vehicles driving in front of and in the front left and right sides of the subject vehicle mainly by using the main camera 21*a* and the sub-camera 21*b* and identify vehicles driving behind and in the back left and right sides of the subject vehicle mainly by using the rear camera.

The surrounding monitor unit 20 recognizes the situation around the subject vehicle and obtains the recognized situation as surrounding environment information. In one example, the surrounding monitor unit 20 may serve as the surrounding environment information obtaining device and form part of the surrounding situation recognition device. The surrounding monitor unit 20 includes surrounding environment recognition sensors 20*a* and a surrounding environment recognizer 20*b*.

Examples of the surrounding environment recognition sensors 20*a* are an ultrasonic sensor, a millimetric wave radar, light detection and ranging (LiDAR), a sensing device, such as a camera, and an autonomous sensor set as a combination of these elements. The autonomous sensor set serves as a surrounding environment detector.

In one example, plural millimetric wave radars are used as the surrounding environment recognition sensors 20*a* and are installed at four corners (front left, front right, back left, and back right, for example) of the subject vehicle.

The front left and right millimetric wave radars are installed on the left and right sides of the front bumper, for example, and are used for monitoring part of the area (such as left and right sides and obliquely front left and right sides) around the subject vehicle which is difficult to recognize from images obtained by the main camera 21*a* and the sub-camera 21*b*.

In one example, the back left and right millimetric wave radars are installed on the left and right sides of the rear bumper, for example, and are used for monitoring part of the area (such as the area from the left and right sides to the back of the subject vehicle) around the subject vehicle which is difficult to recognize by the front left and right millimetric wave radars.

The surrounding environment recognizer 20b obtains surrounding environment information, which is information on moving bodies (such as side vehicles, following vehicles, and oncoming vehicles) around the subject vehicle, based on output signals from the surrounding environment recognition sensors 20a.

In one example, the surrounding monitor unit 20 and the camera unit 21 may form the surrounding environment information obtaining device and the surrounding situation recognition device of the driving control apparatus 1 of the embodiment. The driving environment recognizer 21d of the camera unit 21 and the surrounding environment recognizer 20b of the surrounding monitor unit 20 are coupled to the input side of the driving control unit 22 via the in-vehicle communication line 10. The driving control unit 22 and the map locator calculator 12 are also coupled to each other via the in-vehicle communication line 10 so that they can communicate with each other.

As multiple switches and multiple sensors for detecting in-vehicle environment information (subject vehicle situation information), a mode switch set 33, a steering wheel touch sensor 34, a steering torque sensor 35, a brake sensor 36, and an accelerator sensor 37 are coupled to the input side of the driving control unit 22.

The mode switch set 33 is used by the driver to switch between ON/OFF to choose from various driving modes and multiple driving support control functions. The driver can operate the mode switch set 33 to switch between driving support control modes and between ACC control modes (regular ACC control mode and eco-ACC control mode, for example) so as to select at a desired timing any mode from among various driving control modes that can be executed by the driving control apparatus 1. ACC control will be discussed later in detail.

The mode switch set 33 includes an input operation member used for the driver to set a target vehicle velocity (target velocity value) which is referred to when ACC control is performed. The target vehicle velocity input by the driver using the input operation member will be called a driver set velocity value.

The steering wheel touch sensor 34 detects a state in which the driver is holding the steering wheel (not illustrated) of a steering device. The steering wheel touch sensor 34 is disposed at a certain portion of the steering wheel. The steering wheel touch sensor 34 outputs an ON signal when the driver is holding this portion of the steering wheel, that is, when the driver is steering.

The steering torque sensor 35 detects a steering torque as an operation amount of the driver. The steering torque sensor 35 is disposed on a steering shaft (not illustrated) of the steering device.

The steering wheel touch sensor 34 and the steering torque sensor 35 are sensors for identifying the state in which the driver is holding the steering wheel. In one example, the steering wheel touch sensor 34 and the steering torque sensor 35 serve as a steering state recognizer. Signals from the steering wheel touch sensor 34 and the steering torque sensor 35 are output to the driving control unit 22.

The brake sensor 36 detects an amount by which the driver has stepped on the brake pedal as an operation amount of the driver.

The accelerator sensor 37 detects an amount by which the driver has stepped on the accelerator pedal as an operation amount of the driver.

A notifying device 38 having a monitor panel and a speaker, for example, is coupled to the output side of the driving control unit 22. The notifying device 38 issues an alarm to the driver in response to surrounding environment information, which is obtained by the driving control unit 22 from the driving environment recognizer 21d and the surrounding environment recognizer 20b, and surrounding environments detected from the surrounding environment information. As an alarm to be issued to the driver, the notifying device 38 visually displays an alarm on a display, such as a monitor panel, and/or audibly outputs a sound or a whistle to a sound issuing device, such as a speaker.

If necessary, the notifying device 38 also visually displays or audibly outputs an instruction or a suggestion to the driver, such as "Please step on the brake pedal.", "Please release the accelerator pedal.", and "Please adjust the steering direction."

The driving control unit 22 is a unit that comprehensively performs driving control for the vehicle. For example, the driving control unit 22 contributes to performing driving control when executing ALK control and ACC control.

The driving control unit 22 serves as the following driving controller. While performing ALK control and ACC control, the driving control unit 22 automatically changes a set velocity value used for ACC control in accordance with the recognized surrounding vehicles and surrounding situations and also the situation of the subject vehicle, and then performs driving control based on the changed velocity value.

To implement the above-described control operation, the driving control unit 22 includes a steering support controller 22a, a target driving path setter 22b, and a velocity value setter 22c.

Among various control operations executed by the driving control apparatus 1, the steering support controller 22a performs support control related to the steering operation. For example, the steering support controller 22a supports the driver's steering operation to avoid danger that the subject vehicle may encounter, such as colliding with or touching an obstacle in a target driving path, as well as the steering operation for the driver to stably drive within a driving lane.

For example, the steering support controller 22a suitably performs steering support control while ALK control is being executed to make the subject vehicle drive along the target driving path.

The target driving path setter 22b sets the center positions of a driving lane of the subject vehicle to be a target driving path, based on certain data, such as lane width data. The center positions of the driving lane can be calculated from information on the left and right marking lines of the driving lane, which is determined from the surrounding environment information obtained by the driving environment recognizer 21d of the camera unit 21.

The target driving path setter 22b determines an area including the target driving path as a driving lane to be used by the subject vehicle. The target driving path drawn along the center positions of the driving lane is set within the lane of the subject vehicle and is used as an imaginary, target driving line to be driven by the subject vehicle under ALK control.

The velocity value setter 22c is an element that sets a vehicle velocity value as a reference for driving the subject vehicle under ACC control. The velocity value setter 22c is constituted by a circuit disposed in the driving control unit 22, for example. The velocity value setter 22*c* sets a driver velocity value, which is set by a driver or a passenger of the subject vehicle before the ACC control is executed, a registered velocity value to be referred to while ACC control is being executed, and a temporary velocity value to be automatically set while driving control is performed in the eco-ACC control mode.

The driver set velocity value is a target velocity value input by a driver using the input operation member (not illustrated) included in the mode switch set 33, for example.

The driver set velocity value is stored in a predetermined internal storage region (internal memory, which is not illustrated) of the driving control unit 22.

The temporary velocity value is a velocity value which is temporarily set when driving control is being performed in the eco-ACC control mode, based on the situations of the subject vehicle and surrounding vehicles, surrounding situations, and predetermined conditions. The temporary velocity value is obtained by increasing or decreasing a registered velocity value and is temporarily used during the execution of ACC control.

The registered velocity value is a velocity value to be referred to when ACC control is continuously performed and is registered as a reference for driving the subject vehicle. The velocity value setter 22*c* registers the driver set velocity value as a registered velocity value used for performing driving control in the ACC control mode. The velocity value setter 22*c* also registers at a certain timing the temporary velocity value, which is set during the execution of driving control in the eco-ACC control mode, as a newly registered velocity value reflecting the situations of the subject vehicle and surrounding vehicles and the surrounding situations.

The driving control unit 22 judges various situations, based on output information from the driving environment recognizer 21*d* of the camera unit 21 and the surrounding environment recognizer 20*b* of the surrounding monitor unit 20 and various items of information obtained via the map locator calculator 12, as well as based on in-vehicle environment information (subject vehicle situation information) obtained from the mode switch set 33, the steering wheel touch sensor 34, the steering torque sensor 35, the brake sensor 36, and the accelerator sensor 37. Based on the judging results, the driving control unit 22 performs driving control for the subject vehicle by suitably controlling the engine control unit 23, the power steering control unit 24, and the brake control unit 25. In one example, the mode switch set 33, the steering wheel touch sensor 34, the steering torque sensor 35, the brake sensor 36, and the accelerator sensor 37, may form a subject vehicle situation information obtaining device.

If a self-driving zone where self-driving control is performed is set in the target driving route set by the map locator calculator 12, the driving control unit 22 sets a driving route for performing self-driving control in this self-driving zone. In the self-driving zone, the driving control unit 22 suitably controls the engine control unit 23, the power steering control unit 24, and the brake control unit 25 to allow the subject vehicle to autonomously drive along the target driving route, which is set from the positions of the subject vehicle estimated from various items of information.

During this control operation, if a leading vehicle is detected by the execution of ALK control and ACC control, based on surrounding environment information obtained by the driving environment recognizer 21*d*, the driving control unit 22 performs driving control for the subject vehicle by taking surrounding vehicles into consideration. For example, the driving control unit 22 causes the subject vehicle to follow the leading vehicle in accordance with the selected ACC control mode. If a leading vehicle is not detected, the driving control unit 22 performs driving control for the subject vehicle, based on the driver set velocity value or the registered velocity value.

In addition to ALK control, the driving control unit 22 also executes selected steering support control, such as control for avoiding lane deviation and control for changing lanes. Depending on the situation, the driving control unit 22 performs other driving control, such as emergency driving stop control if an abnormality occurs to the driver.

As discussed above, the driving control unit 22 is coupled to other control units, such as the engine control unit 23, the power steering control unit 24, and the brake control unit 25, via the in-vehicle communication line 10 so as to control these control units.

A throttle actuator 27 is coupled to the output side of the engine control unit 23. The throttle actuator 27 is used to open and close a throttle valve of an electronic control throttle provided in a throttle body of an engine. In response to a control signal from the engine control unit 23, the driving control unit 22 controls the throttle actuator 27 so that the throttle actuator 27 opens/closes the throttle valve, thereby adjusting the air intake amount. This makes it possible to generate a desired level of engine output.

An electric power steering motor 28 is coupled to the output side of the power steering control unit 24. The electric power steering motor 28 applies a steering torque to a steering mechanism by using a rotational force of an electric motor. When a certain operation mode is selected, the driving control unit 22 controls the electric power steering motor 28 in response to a drive signal from the power steering control unit 24, thereby executing various steering support control operations for supporting the steering operation. The steering torque sensor 35 presents a steering torque value by detecting a change in the driving amount of the electric power steering motor 28 or the driving amount of the steering mechanism.

A brake actuator 29 is coupled to the output side of the brake control unit 25. The brake actuator 29 adjusts the brake fluid pressure to be applied to a brake wheel cylinder provided in each wheel. The driving control unit 22 drives the brake actuator 29 in response to a drive signal from the brake control unit 25. This generates a braking force in each wheel via the brake wheel cylinder, thereby forcing the subject vehicle to decelerate.

All or some of the functions of the map locator calculator 12, the surrounding environment recognizer 20*b*, the driving environment recognizer 21*d*, the driving control unit 22, the engine control unit 23, the power steering control unit 24, and the brake control unit 25 are constituted by a processor including hardware.

The processor is configured, as in a known processor. For example, the processor includes a central processing unit (CPU), a random access memory (RAM), a read only memory (ROM), a non-volatile memory, a non-volatile storage, and a non-transitory computer readable medium and also includes peripheral devices.

A software program to be executed by the CPU and fixed data, such as a data table, are suitably stored in the ROM, non-volatile memory, and non-volatile storage. The CPU reads the software program stored in the ROM, for example, loads it into the RAM, and executes it, and the software program refers to various items of data. As a result, the individual functions of the above-described elements and units (map locator calculator 12, surrounding environment recognizer 20b, driving environment recognizer 21d, driving control unit 22, engine control unit 23, power steering control unit 24, and brake control unit 25) are implemented.

The processor may be constituted by a semiconductor chip, such as a field programmable gate array (FPGA). The above-described elements and units (map locator calculator 12, surrounding environment recognizer 20b, driving environment recognizer 21d, driving control unit 22, engine control unit 23, power steering control unit 24, and brake control unit 25) may be constituted by an electronic circuit.

The entirety or part of the software program may be recorded as a computer program product in a portable disc medium, such as a flexible disk, a compact disc—read only memory (CD-ROM), and a digital versatile disc—read only memory (DVD-ROM), or in a non-transitory computer readable medium, such as a card memory, an HDD, and an SSD.

Figure 2:
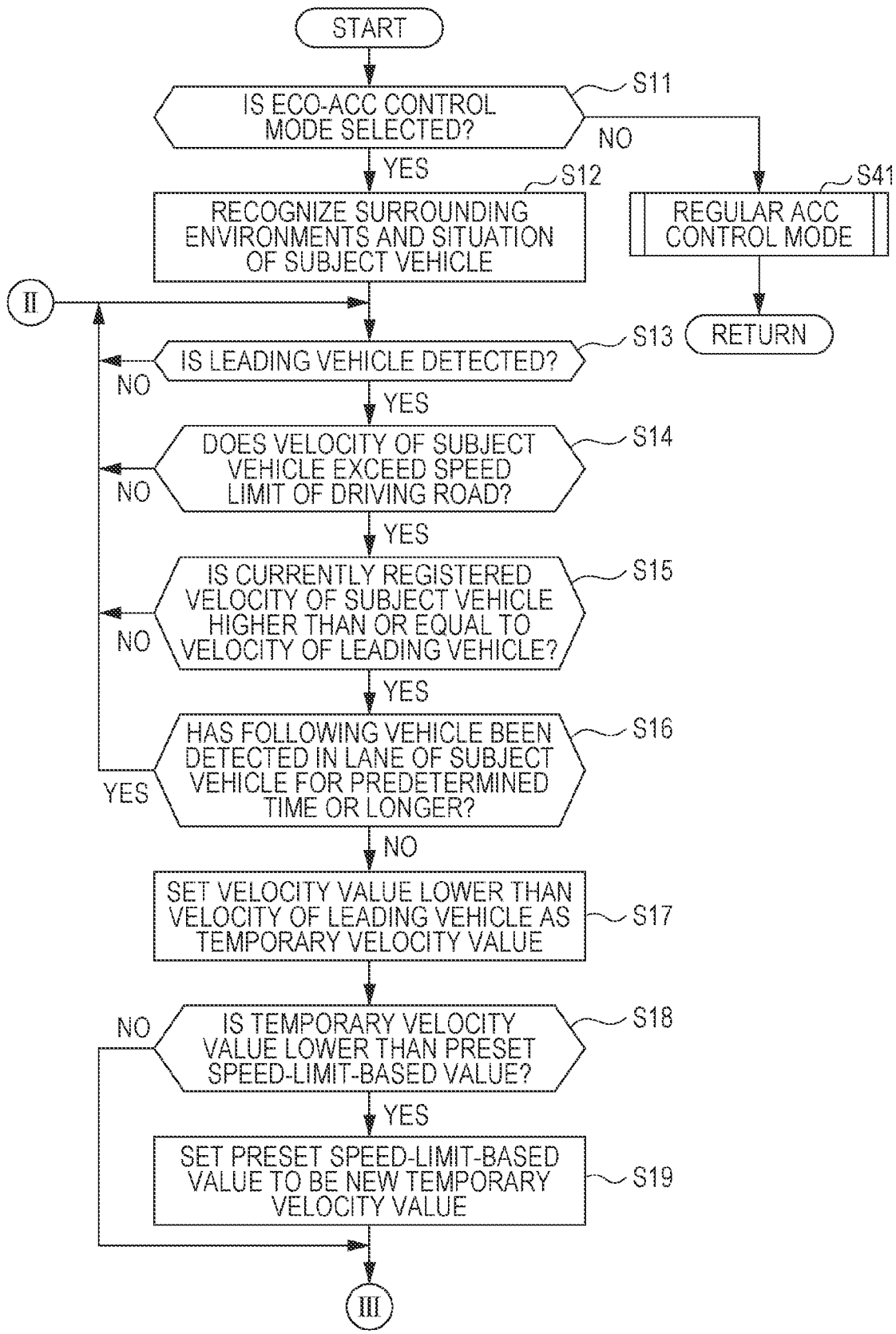
FIGS. 2 through 4 are a flowchart illustrating a procedure of adaptive cruise control (ACC) executed by the driving control apparatus.
Figure 3:
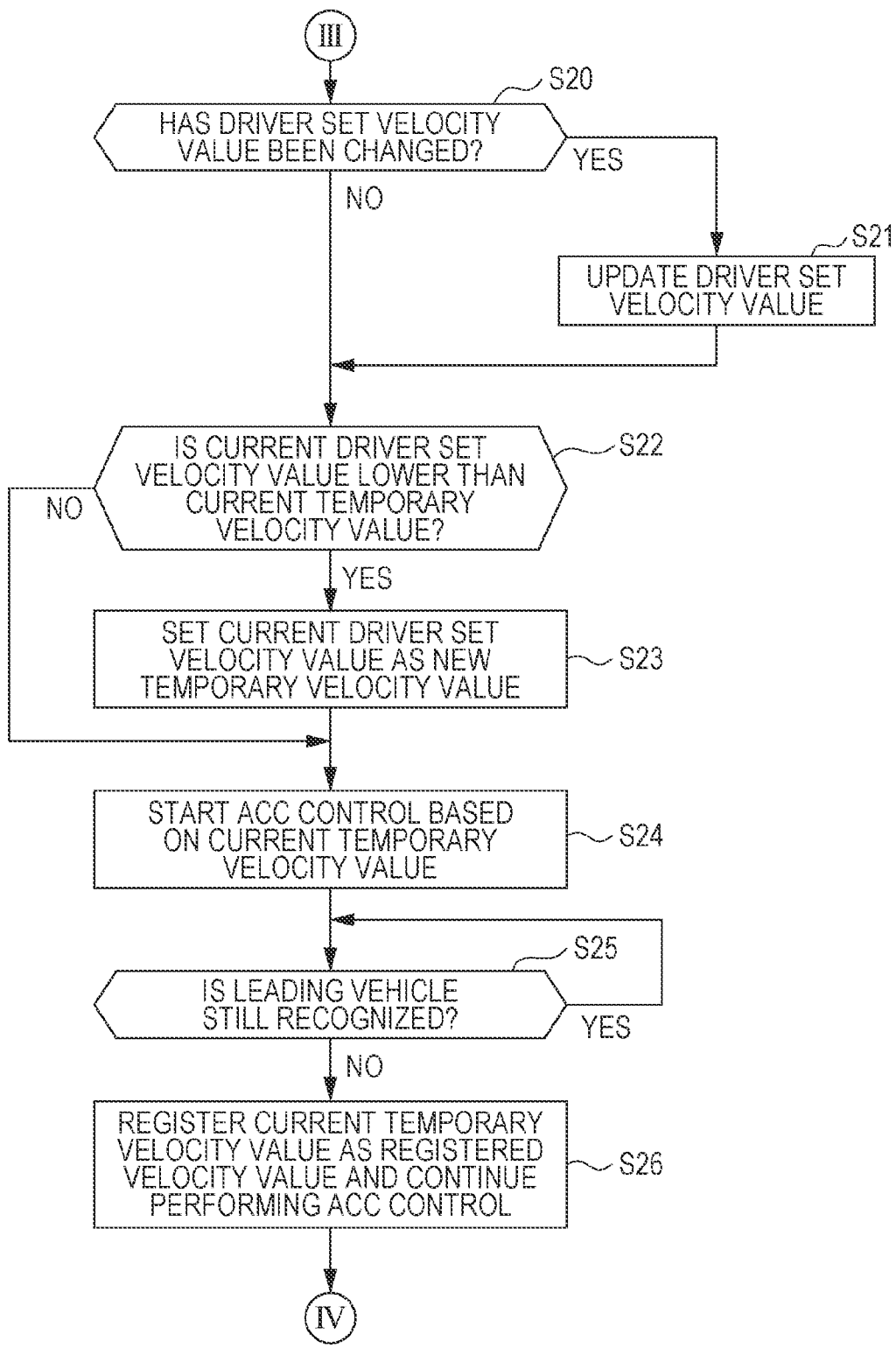
Figure 4:
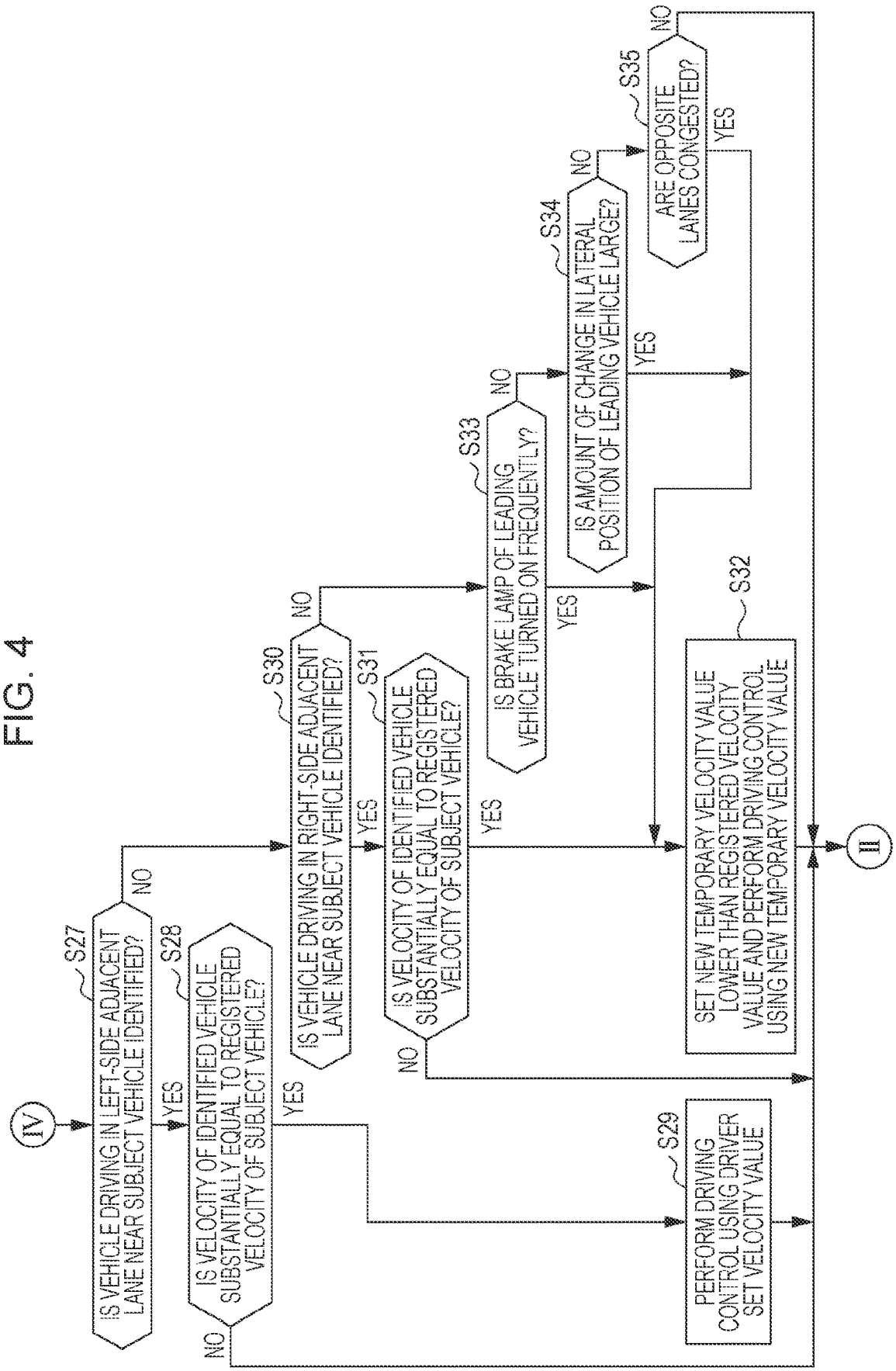

A description will be given of how the subject vehicle including the above-configured driving control apparatus 1 drives on a road under ACC control. FIGS. 2 through 4 are a flowchart illustrating a procedure of ACC control executed by the driving control apparatus 1. FIG. 2 illustrates a first part of the flowchart. FIG. 3 illustrates a second part of the flowchart. FIG. 4 illustrates a third part of the flowchart.

When a driver starts the subject vehicle including the driving control apparatus 1, individual units, such as the camera unit 21, the surrounding monitor unit 20, and the driving control unit 22 are activated, and the vehicle begins to drive on the road in response to a certain operation of the driver.

After the vehicle is powered ON and before it starts to drive, the driver selects a desired driving control operation by using various operation members included in the mode switch set 33, for example. The driving control operation regarding an embodiment of the disclosure mainly concerns ACC control.

The driver first turns ON ACC control and selects a desired ACC control mode. The driver also inputs a value as a driver set velocity value, which is used as a reference during ACC control, into the driving control apparatus 1 by using a certain operation member. Information on set values, such as the driver set velocity value, is stored in the internal memory (not illustrated) of the driving control unit 22, for example.

Then, the driving control apparatus 1 starts ACC control in a selected mode (such as the regular ACC control mode or eco-ACC control mode). The driver then performs a certain operation and the vehicle starts driving on the road.

For the sake of simple representation, in the following description, reference will be given to ACC control, which is directly related to the disclosure, and an explanation of other control operations, which are not directly related to the disclosure, will be omitted.

In step S11 in FIG. 2, the driving control unit 22 judges whether the current ACC control mode is the eco-ACC control mode. If the eco-ACC control mode is set, the driving control unit 22 proceeds to step S12 to start a processing sequence of the eco-ACC control mode. If the current ACC control mode is not the eco-ACC control mode, the driving control unit 22 proceeds to step S41.

In step S41, the driving control unit 22 starts a processing sequence for the regular ACC control mode. In the regular ACC control mode, basically, the subject vehicle is controlled to drive based on a velocity value set by the driver. If a leading vehicle is detected during the execution of ACC control in the regular ACC control mode, the subject vehicle is controlled to follow the leading vehicle while maintaining a certain distance with the leading vehicle. Such driving control in the regular ACC control mode is known and is performed by a known driving control apparatus, and an explanation thereof will be omitted.

Control processing in the regular ACC control mode executed in step S41 is terminated when the driver switches to another mode or when the subject vehicle is powered OFF (engine OFF).

Although only the regular ACC control mode is discussed as a control mode other than the eco-ACC control mode in the driving control apparatus 1, another ACC control mode may also be available. To describe the driving control apparatus 1 of the embodiment, however, ACC control modes other than the eco-ACC control mode are not directly related to the disclosure and an explanation thereof will thus be omitted. Details of the processing sequence for the eco-ACC control mode in the driving control apparatus 1 of the embodiment will be described below.

As stated above, after checking that the eco-ACC control mode is selected in step S11, the driving control unit 22 proceeds to step S12. In step S12, the driving control unit 22 starts processing for recognizing environments around the subject vehicle (may also be called surrounding environment recognition processing) and processing for recognizing the situation of the subject vehicle (may also be called subject vehicle situation recognition processing) by using the surrounding environment recognizer 20b, the driving environment recognizer 21d, and the locator unit 11. The driving control unit 22 then proceeds to step S13.

The surrounding environment recognition processing is processing for recognizing environments ahead of and around the subject vehicle, such as the left and right marking lines of a driving lane of the subject vehicle and those of adjacent lanes, road signs (speed limit sign, for example), and vehicles around the subject vehicle.

The subject vehicle situation recognition processing is processing for recognizing the situation of the subject vehicle, such as the current velocity value, the set driving control type, and the driver set velocity value or the registered velocity value. The surrounding environment recognition processing and subject vehicle situation recognition processing are constantly executed while the driving control apparatus 1 is ON.

It is assumed that, after executing step S12, information at least on the speed limit of the road of the subject vehicle has been obtained. Information on the speed limit can be obtained from a road sign or a road marking that can be recognized from image data obtained by the camera unit 21. Information on the speed limit may be included in map information obtained by the locator unit 11. It is also assumed that, after executing step S12, information at least on the velocity value of the subject vehicle and the driver set velocity value or the registered velocity value has been obtained as information about the situation of the subject vehicle.

In step S13, the driving control unit 22 judges whether a leading vehicle is detected. If the leading vehicle is not detected, the driving control unit 22 returns to step S12. In this case, the driving control unit 22 performs control similar to regular ACC control so that the subject vehicle keeps the speed based on a currently registered velocity value (such as the driver set velocity value or the temporary velocity value which is automatically set by control processing described below). The driving control unit 22 then returns to step S12.

If a leading vehicle is found in step S13, the driving control unit 22 proceeds to step S14.

In step S14, the driving control unit 22 judges whether the velocity of the subject vehicle recognized in step S12 exceeds the speed limit of the driving road of the subject vehicle. The velocity of the subject vehicle is determined based on wheel speeds calculated based on data detected by the wheel speed sensor 14 and also based on wheel data of the subject vehicle (numeric values, such as the tire size). A known technique can be used for calculating the velocity of the subject vehicle in this manner.

If it is found in step S14 that the velocity of the subject vehicle does not exceed the speed limit of the driving road, the driving control unit 22 returns to step S12. If the subject vehicle is driving at a velocity lower than or equal to the speed limit, it is likely that the subject vehicle is following the leading vehicle and is basically driving safely. The driving control unit 22 thus performs driving control similar to regular ACC control so that the subject vehicle follows the leading vehicle by maintaining a certain distance with the leading vehicle. The driving control unit 22 then returns to step S12.

If the velocity of the subject vehicle is found to exceed the speed limit in step S14, the driving control unit 22 proceeds to step S15. If the velocity of the subject vehicle exceeds the speed limit, it can be assumed that the driver set velocity value also exceeds the speed limit.

In step S15, the driving control unit 22 judges whether the currently registered velocity value (driver set velocity value or automatically set temporary velocity value) is higher than or equal to the velocity of the leading vehicle. The velocity of the leading vehicle can be determined by a known technique using a stereo image obtained by the camera unit 21, for example.

If the currently registered velocity value is found to be lower than the velocity of the leading vehicle in step S15, the driving control unit 22 returns to step S12. If the currently registered velocity value is lower than the velocity of the leading vehicle, the subject vehicle would not drive at a velocity higher than or equal to the currently registered velocity value. Hence, if the driving control unit 22 performs control so that the subject vehicle maintains a velocity based on the currently registered velocity value, the distance between the subject vehicle and the leading vehicle gradually increases since the leading vehicle is driving faster than the subject vehicle. That is, the subject vehicle is not influenced by the leading vehicle. The driving control unit 22 thus performs control so that the subject vehicle continues driving at a velocity based on the currently registered velocity value. The driving control unit 22 then returns to step S12.

In contrast, if the currently registered velocity value is found to be higher than or equal to the velocity of the leading vehicle in step S15, the driving control unit 22 proceeds to step S16. If the currently registered velocity value is not lower than the velocity of the leading vehicle, the subject vehicle is approaching the leading vehicle and may catch up with it. It is also found from the result of step S14 that the subject vehicle is driving at a velocity exceeding the speed limit. In such circumstances, safe driving of the subject vehicle is not guaranteed. Additionally, the subject vehicle is driving faster than or as fast as the leading vehicle. This may decrease the fuel consumption rate.

In the driving control apparatus 1 of the embodiment, if such a situation is detected, the driving control unit 22 executes step S17 and subsequent steps so that the subject vehicle will drive at a velocity lower than the leading vehicle.

In this situation, however, in the lane of the subject vehicle, another vehicle may be following the subject vehicle or may be approaching from behind the subject vehicle. In such a situation, if the driving control unit 22 performs control so that the subject vehicle decelerates to a velocity lower than the leading vehicle, the vehicle behind the subject vehicle may be prevented from driving smoothly.

Considering such a possibility, in the driving control apparatus 1 of the embodiment, after step S15, the driving control unit 22 checks the presence of a following vehicle driving in the lane of the subject vehicle in step S16.

In step S16, the driving control unit 22 judges whether a following vehicle driving in the lane of the subject vehicle has been continuously detected for a predetermined time or longer. If such a vehicle has been detected, it is likely that, in the lane of the subject vehicle, another vehicle is following the subject vehicle behind or another vehicle is approaching from behind the subject vehicle.

If it is determined in step S16 that such a vehicle has been continuously detected for the predetermined time or longer, the driving control unit 22 returns to step S12 so as not to disturb the following vehicle. In this manner, ACC control in the eco-ACC control mode is not executed in the case of the presence of a following vehicle.

In contrast, if it is determined in step S16 that no following vehicle has been detected in the lane of the subject vehicle for the predetermined time or longer, the driving control unit 22 proceeds to step S17 to start ACC control in the eco-ACC control mode.

In step S17, the driving control unit 22 sets a velocity value lower than the velocity of the leading vehicle (hereinafter called a temporary velocity value). The temporary velocity value is lower than the current velocity of the leading vehicle by ten percent (10%), for example.

Then, in step S18, the driving control unit 22 judges whether the temporary velocity value set in step S17 is lower than a preset velocity value based on the speed limit of the driving road of the subject vehicle. This preset velocity value will be called a preset speed-limit-based value.

The preset speed-limit-based value is a value which is preset based on the speed limit of the driving road of the subject vehicle. In one example, the preset speed-limit-based value may be a value equivalent to the speed limit of the driving road or a value reduced by ten to fifty percent (10 to 50%).

For example, it is assumed that the preset speed-limit-based value is a value lower than the speed limit by 20%. When the speed limit of the driving road is 80 kilometers per hour (km/h), the preset speed-limit-based value is 64 km/h. When the speed limit of the driving road is 100 km/h, the preset speed-limit-based value is 80 km/h.

When setting the speed-limit-based value, the percentage by which the speed limit is reduced may be determined based on various conditions, such as the driving control apparatus 1 as an individual unit, the type of vehicle including the driving control apparatus 1, and the condition of the driving road (such as whether the road is a highway or a local road).

The preset speed-limit-based value may be a value equal to the speed limit of the driving road. It is however desirable that the preset speed-limit-based value does not exceed the speed limit, namely, that it is lower than or equal to the speed limit. The preset speed-limit-based value is defined as the lower limit value of the temporary velocity value, which is automatically set when ACC control is executed in the eco-ACC control mode. This will be discussed later in detail. Setting the preset speed-limit-based value in this manner enables the driving control apparatus 1 to perform control so that the velocity of the subject vehicle is restricted to the speed limit and also that the subject vehicle is separating away from the leading vehicle. This control operation will be discussed later. The driving control apparatus 1 can thus maintain safe, smooth driving of the subject vehicle.

If the temporary velocity value set in step S17 is found to be lower than the preset speed-limit-based value in step S18, the driving control unit 22 proceeds to step S19.

In step S19, the driving control unit 22 sets the preset speed-limit-based value to be a new temporary velocity value. The driving control unit 22 then proceeds to step S20 in FIG. 3.

If the temporary velocity value set in step S17 is found to be higher than or equal to the preset speed-limit-based value in step S18, the driving control unit 22 proceeds to step S20 in FIG. 3.

Steps S18 and S19 will be explained below in detail. The temporary velocity value at a time point in step S18 is a value lower than the velocity of the leading vehicle (step S17). Additionally, the preset speed-limit-based value is a value whose upper limit value is equal to the speed limit of the driving road, as stated above.

It is assumed that the temporary velocity value, which is lower than the velocity of the leading vehicle, is found to be lower than the preset speed-limit-based value in step S18. In this case, even if the subject vehicle drives at the preset speed-limit-based value which exceeds the current temporary velocity value, it can maintain a velocity lower than the leading vehicle and would not catch up with the leading vehicle.

This is because, at this time point, the leading vehicle is likely to drive at a velocity exceeding the speed limit. If the velocity of the leading vehicle is almost the same as the speed limit, it means that the temporary velocity value set in step S17 is not higher than the speed limit since it is set to be lower than the velocity of the leading vehicle. If the leading vehicle is driving at a velocity exceeding the speed limit, it means that the temporary velocity value set in step S17 is slightly higher than the speed limit or is lower than or equal to the speed limit since it is set to be lower than the velocity of the leading vehicle.

In this situation, in step S19, the driving control unit 22 raises the temporary velocity value to the preset speed-limit-based value. Since the raised temporary velocity value does not exceed the speed limit, the subject vehicle does not catch up with the leading vehicle and can maintain safe driving.

If the temporary velocity value, which is lower than the velocity of the leading vehicle, is found to be higher than or equal to the preset speed-limit-based value in step S18, the subject vehicle would not catch up with the leading vehicle as long as it keeps the current temporary velocity value, which is lower than the velocity of the leading vehicle. The driving control unit 22 thus maintains the current temporary velocity value and proceeds to step S20 by skipping step S19.

In step S20, the driving control unit 22 judges whether the driver has changed the driver set velocity value after step S15. The driver may change the driver set velocity value in the following situations. At some time point after step S15, the driver may have recognized that the subject vehicle is approaching the leading vehicle. In this case, the driver may voluntarily decrease the driver set velocity value. This is why the driving control unit 22 checks in step S20 whether the driver set velocity value has been changed.

If the driver set velocity value is found to have been changed in step S20, the driving control unit 22 proceeds to step S21.

In step S21, the driving control unit 22 sets a new driver velocity value (updates the previous driver set velocity value) and proceeds to step S22.

If it is determined in step S20 that the driver set velocity value has not been changed, the driving control unit 22 proceeds to step S22 by skipping step S21. In this case, the velocity value set by the driver before starting driving is maintained.

In step S22, the driving control unit 22 checks whether the current driver set velocity value (the value set by the driver before starting driving or the value updated in step S21) is lower than the current temporary velocity value (the value set in step S17 or S19). If the current driver set velocity value is found to be lower than the current temporary velocity value, the driving control unit 22 proceeds to step S23.

In step S23, the driving control unit 22 sets the current driver set velocity value to be a new temporary velocity value. The driving control unit 22 then proceeds to step S24.

If the current driver set velocity value is found to be higher than or equal to the current temporary velocity value in step S22, the driving control unit 22 maintains the current temporary velocity value and proceeds to step S24 by skipping step S23.

In step S24, the driving control unit 22 starts ACC control based on the current temporary velocity value.

Steps S22 and S23 will be explained below in detail. The temporary velocity value at a time point in step S22 is lower than the velocity of the leading vehicle. Additionally, the driver set velocity value may have been lowered in steps S20 and S21, as discussed above.

That is, if it is found in step S22 that the current driver set velocity value is found to be lower than the current temporary velocity value, which is lower than the velocity of the leading vehicle, the driver set velocity value may have been lowered in steps S20 and S21.

Hence, in this case, in step S23, the driving control unit 22 lowers the temporary velocity value to the current driver set velocity value. At this time point, the velocity at which the subject vehicle drives is changed to a velocity lower than the current temporary velocity value which is lower than the velocity of the leading vehicle. Thus, the subject vehicle would not catch up with the leading vehicle and does not exceed the speed limit, whereby the subject vehicle can maintain safe driving.

In contrast, if the current driver set velocity value is found to be higher than or equal to the current temporary velocity value in step S22, it can be assumed that the driver set velocity value has not been changed and the driver keeps the velocity value which has been set before starting driving.

If the subject vehicle keeps the current temporary velocity value, it would not catch up with the leading vehicle. The driving control unit 22 thus maintains the current temporary velocity value and proceeds to step S24 by skipping step S23.

After ACC control is started in step S24, the driving control unit 22 checks whether the leading vehicle is still recognized in step S25. If the leading vehicle is no longer detected, the driving control unit 22 proceeds to step S26. If the leading vehicle is still recognized, the driving control unit 22 repeats step S24 while executing ACC control until the leading vehicle is no longer detected.

In step S26, the driving control unit 22 registers the current temporary velocity value as the registered velocity value for ACC control and continues performing ACC control based on the registered velocity value. The driving control unit 22 then proceeds to step S27 in FIG. 4.

As discussed above (steps S11 through S26), the driving control apparatus 1 of the embodiment executes ACC control in the eco-ACC control mode when all the following conditions are satisfied: (1) a leading vehicle is detected (step S13); (2) the velocity of the subject vehicle exceeds the speed limit value of the driving road (step S14); (3) the currently registered velocity value is higher than or equal to the velocity of the leading vehicle (step S15); and (4) no following vehicle has been detected for the predetermined time or longer (step S16).

When these conditions are satisfied, the driving control unit 22 sets a velocity lower than the velocity of the leading vehicle as a temporary velocity value (step S17). The temporary velocity value is automatically set within a certain range from the preset speed-limit-based value (lower limit value) (step S19) to the driver set velocity value (upper limit value) (step S23).

The speed-limit-based value is set as the lower limit value of the range of the temporary velocity value so as not to disturb a smooth driving flow. In the above-described situation, it is likely that surrounding vehicles including the subject vehicle and the leading vehicle are driving in excess of the speed limit of the driving road. If the subject vehicle strictly obeys the speed limit, it drives against the smooth driving flow of the surrounding vehicles and may even cause a dangerous situation. The driving control apparatus 1 therefore performs control so that the subject vehicle can drive smoothly in accordance with the traffic flow of the surrounding vehicles even if the velocity exceeds the speed limit of the driving road. The reason why the driver set velocity value is set as the upper limit value of the temporary velocity value is to reflect the intention of the driver.

ACC control starts based on the temporary velocity value automatically set as described above (step S24). Since the automatically set temporary velocity value is not lower than the preset speed-limit-based value, the subject vehicle drives in accordance with the traffic flow of the surrounding vehicles. Even when the subject vehicle decelerates, it does not disturb the smooth traffic flow.

Additionally, the subject vehicle does not drive in excess of the driver set velocity value, thereby achieving efficient, safe driving control. At the same time, the subject vehicle drives at a reasonably low velocity, thereby contributing to improving the fuel consumption rate. As a result of setting the temporary velocity value so that the velocity of the subject vehicle becomes lower than that of the leading vehicle, the distance between the subject vehicle and the leading vehicle can be increased. This can prevent the subject vehicle from catching up with and approaching the leading vehicle so as to avoid an accident, such as a collision.

As the distance between the subject vehicle and the leading vehicle is gradually increasing, the leading vehicle is separating away from the subject vehicle forward. Eventually, the leading vehicle is out of the view of the subject vehicle. Then, the driving control apparatus 1 of the subject vehicle sets the current temporary velocity value as a registered velocity value and performs ACC control based on this registered velocity value. Hence, the subject vehicle can maintain safe driving.

The basic operation of ACC control executed by the driving control apparatus 1 when the eco-ACC control mode is selected has been discussed above (steps S11 through S26).

Figure 5:
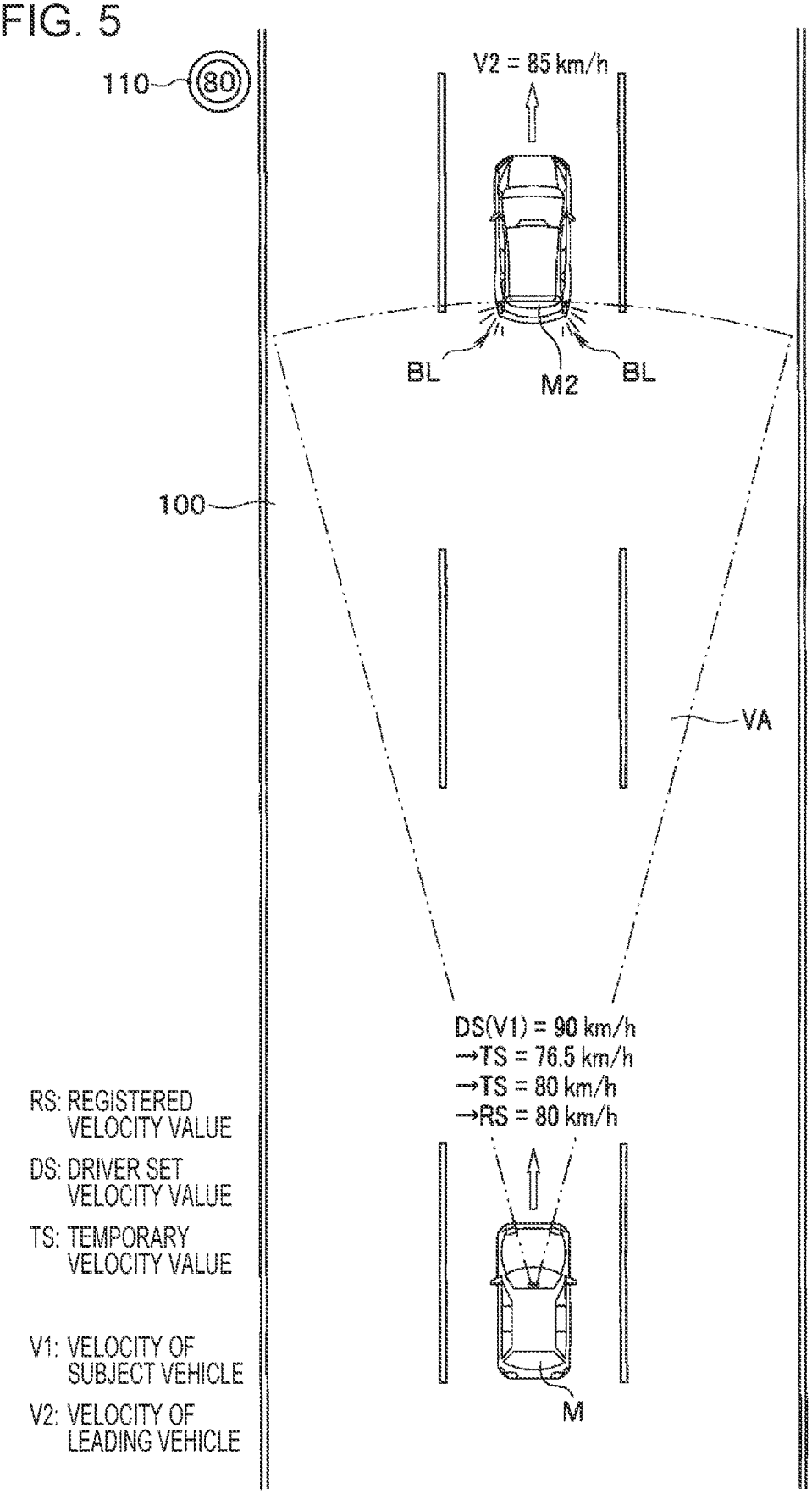
FIG. 5 is a conceptual view for explaining a processing sequence of step S11 in FIG. 2 through step S26 in FIG. 3 through illustration of an example.

This basic operation will be briefly described below through illustration of a specific example. FIG. 5 is a conceptual view for explaining the processing sequence of steps S11 through S26 through illustration of a specific example.

In FIG. 5, a subject vehicle M having the driving control apparatus 1 of the embodiment mounted therein/thereon is illustrated. It is assumed that the subject vehicle M is driving on a road 100 while turning ON the driving control apparatus 1. The road 100 has three lanes each way. The opposite side of the road 100 is not illustrated in FIG. 5.

The subject vehicle M is driving in the center lane of the road 100. A speed limit sign 110 indicates that the speed limit of the road 100 is 80 km/h.

In the above-described situation, the subject vehicle M is driving under ACC control with a driver set velocity value DS of 90 km/h. That is, the subject vehicle M is driving at a velocity V1 of 90 km/h in excess of the speed limit (YES in step S14).

As illustrated in FIG. 5, a leading vehicle M2 is driving ahead of the subject vehicle M in the center lane and the subject vehicle M recognizes the leading vehicle M2 (YES in step S13). A range that is recognizable by the camera unit 21, which serves as the surrounding environment information obtaining device, is indicated by the long dashed double-dotted line VA in FIG. 5. This range may also be called a viewable area.

One of the situations where the subject vehicle M recognizes the leading vehicle M2 may be that the subject vehicle M is approaching the leading vehicle M2. In this case, the leading vehicle M2 is likely to be driving at a velocity lower than the subject vehicle M. For example, the leading vehicle M2 is driving at a velocity V2 of 85 km/h, which is lower than the driver set velocity value DS of 90 km/h of the subject vehicle M (YES in step S15).

Another situation where the subject vehicle M recognizes the leading vehicle M2 may be that another vehicle has cut into the center lane ahead of the subject vehicle M from an adjacent lane (such a situation is not illustrated). In this case, the subject vehicle M recognizes such a vehicle as another leading vehicle M2. For example, the state illustrated in FIG. 5 corresponds to a state in which the leading vehicle M2 is driving ahead of the subject vehicle M after having cut into the center lane from an adjacent lane.

In the above-described situation, it is assumed that the subject vehicle M is cruising at a driver set velocity value DS of 90 km/h. In this case, if the velocity V2 (100 km/h, for example) of the leading vehicle M2 is higher than the velocity (90 km/h) of the subject vehicle M, the leading vehicle M2 is gradually separating from the subject vehicle M forward. If the velocity V2 (85 km/h, for example) of the leading vehicle M2 is lower than the velocity (90 km/h) of the subject vehicle M, the subject vehicle M is approaching the leading vehicle M2 and eventually catches up with it (YES in step S15). FIG. 5 illustrates a case in which the velocity V2 of the leading vehicle M2 is 85 km/h.

The subject vehicle M compares the current velocity value (driver set velocity value DS: 90 km/h) with the velocity value of the leading vehicle M2. If the velocity of the subject vehicle M is higher than or equal to that of the leading vehicle M2 (YES in FIG. 15), the subject vehicle M starts ACC control in the eco-ACC control mode (step S17) after ensuring that no vehicle is found behind the subject vehicle M (NO in step S16).

As a result of comparing the current velocity value of the subject vehicle M with that of the leading vehicle M2, if the velocity of the subject vehicle M is found to be lower than that of the leading vehicle M2 (NO in step S15), the subject vehicle M continues driving by keeping the current velocity value.

After starting ACC control in the eco-ACC control mode, the subject vehicle M first sets a value lower than the velocity V2 (85 km/h) of the leading vehicle M2 as a temporary velocity value TS (step S17).

For example, the velocity value V2 (85 km/h) of the leading vehicle M2 is reduced by 10% and the resulting value is set as the temporary velocity value TS (76.5 km/h).

If the temporary velocity value TS (76.5 km/h) is lower than a preset speed-limit-based value SL (YES in step S18), the preset speed-limit-based value is set as a new temporary velocity value TS (step S19).

In one example, the speed limit (80 km/h) is reduced by 10% and the resulting value is set as the preset speed-limit-based value SL (72 km/h).

In this case, since the temporary velocity value TS (76.5 km/h) is higher than the preset speed-limit-based value SL (72 km/h) (NO in step S18), the temporary velocity value TS (76.5 km/h) is maintained.

In another example, the velocity value equivalent to the speed limit (80 km/h) is set as the preset speed-limit-based value SL (80 km/h).

In this case, since the temporary velocity value TS (76.5 km/h) is lower than the preset speed-limit-based value SL (80 km/h) (YES in step S18), the preset speed-limit-based value SL is set as a new temporary velocity value TS (step S19). That is, the temporary velocity value TS is updated from 76.5 km/h to 80 km/h.

If the driver set velocity value DS has been changed by the time point in step S19, it is updated. If the driver has not changed the driver set velocity value DS, the driver set velocity value DS (90 km/h) is maintained (NO in step S20).

If the driver has lowered the driver set velocity value DS (YES in step S20), the driver set velocity value DS is updated (step S21).

For example, the driver has lowered the driver set velocity value DS (YES in step S20), and the current driver set velocity value DS (90 km/h) is changed to a new driver set velocity value DS (70 km/h) (step S21).

The current temporary velocity value TS (76.5 km/h or 80 km/h) is compared with the current driver set velocity value DS (90 km/h or 70 km/h). If the current driver set velocity value DS is higher than or equal to the current temporary velocity value TS (NO in step S22), the current temporary velocity value TS is maintained. If the current driver set velocity value DS is lower the current temporary velocity value TS (YES in step S22), it is set as a new temporary velocity value TS (step S23).

If the current temporary velocity value TS is 76.5 km/h and the driver set velocity value DS is 90 km/h (NO in step S22), the current temporary velocity value TS (76.5 km/h) is maintained.

If the current temporary velocity value TS is 76.5 km/h and the driver set velocity value DS is 70 km/h (YES in step S22), the driver set velocity value DS is set as a new temporary velocity value TS (step S23). That is, the temporary velocity value TS is updated from 76.5 km/h to 70 km/h.

If the current temporary velocity value TS is 80 km/h and the driver set velocity value DS is 90 km/h (NO in step S22), the current temporary velocity value TS (80 km/h) is maintained.

If the current temporary velocity value TS is 80 km/h and the driver set velocity value DS is 70 km/h (YES in step S22), the driver set velocity value DS is set as a new temporary velocity value TS (step S23). That is, the temporary velocity value TS is updated from 80 km/h to 70 km/h.

Then, eco-ACC control starts based on the current temporary velocity value TS (76.5 km/h, 70 km/h, or 80 km/h). To whichever value the temporary velocity value TS is set, it is lower than the velocity V2 of the leading vehicle M2. Hence, the leading vehicle M2 will soon be out of view of the subject vehicle M.

When the subject vehicle M no longer recognizes the leading vehicle M2 (NO in step S25), the driving control apparatus 1 registers the current temporary velocity value TS as a registered velocity value and continues performing eco-ACC control (step S26). The subject vehicle M can thus keep driving safely.

As described above, when all the following conditions are satisfied: (1) leading vehicle is detected (step S13); (2) the velocity of the subject vehicle exceeds the speed limit value of the driving road (step S14); (3) the currently registered velocity value is higher than or equal to the velocity of the leading vehicle (step S15); and (4) no following vehicle has been detected for the predetermined time or longer (step S16), the current temporary velocity value of the subject vehicle M is lowered based on a certain condition. Then, ACC control is performed based on the reduced temporary velocity value. As a result, the subject vehicle M can increase the distance with the leading vehicle M2.

In ACC control performed by the driving control apparatus 1 of the embodiment in the eco-ACC control mode, in addition to the above-described basic processing sequence (steps S11 through S26), a processing sequence starting in step S27 in FIG. 4 is also executed. In this processing sequence, the driving control apparatus 1 performs driving control by considering the presence of vehicles other than leading and following vehicles, that is, side vehicles driving in the left and right lanes next to the driving lane of the subject vehicle and also by considering the situation of opposite lanes.

It is assumed that ACC control based on the velocity value registered in step S26 in FIG. 3 is continuously performed. In step S27 in FIG. 4, the driving control unit 22 judges whether a vehicle driving in a left-side adjacent lane near the subject vehicle is identified.

In this case, the subject vehicle is assumed to be driving in a lane other than the leftmost lane of a multi-lane road, such as the road 100 illustrated in FIG. 5. In the example in FIG. 6, the subject vehicle is driving in the center lane of a three-lane road each way and another vehicle is driving in the left-side adjacent lane near the subject vehicle. Besides the example in FIG. 6, a situation where the subject vehicle is driving in the right-side adjacent lane of a two-lane road may also be applicable.

If a vehicle driving in the left-side adjacent lane near the subject vehicle is recognized in step S27, the driving control unit 22 proceeds to step S28.

In step S28, the driving control unit 22 detects the velocity value of the identified vehicle in the left-side adjacent lane and judges whether the detected velocity value is substantially equal to the registered velocity value (namely, the current velocity) of the subject vehicle. The velocity of the vehicle in the left-side adjacent lane can be determined by using a known technique based on the detection results of the surrounding environment recognition sensors 20a, such as millimetric wave radars, included in the surrounding monitor unit 20.

If the velocity value of the vehicle in the left-side adjacent lane is found to be substantially equal to the registered velocity value of the subject vehicle in step S28, the driving control unit 22 proceeds to step S29.

In step S29, the driving control unit 22 performs driving control by using the currently set driver velocity value instead of the currently registered velocity value. This allows the subject vehicle to drive faster than the vehicle in the left-side adjacent lane. The subject vehicle is being separated forward from the vehicle in the left-side adjacent lane so as to increase the distance with this vehicle. The driving control unit 22 then returns to step S12 in FIG. 2.

If it is determined in step S28 that the velocity value of the vehicle in the left-side adjacent lane is not substantially equal to the registered velocity value of the subject vehicle, the driving control unit 22 continues performing control with the currently registered velocity value by skipping step S29 and then returns to step S12 in FIG. 2.

If no vehicle driving in the left-side adjacent lane near the subject vehicle is identified in step S27, the driving control unit 22 proceeds to step S30.

In step S30, the driving control unit 22 judges whether a vehicle driving in a right-side adjacent lane near the subject vehicle is identified.

In this case, the subject vehicle is assumed to be driving in a lane other than the rightmost lane of a multi-lane road, such as the road 100 illustrated in FIG. 5. In the example in FIG. 7, the subject vehicle is driving in the center lane of a three-lane road each way and another vehicle is driving in the right-side adjacent lane near the subject vehicle. Bedsides the example in FIG. 7, a situation where the subject vehicle is driving in the left-side adjacent lane of a two-lane road may also be applicable.

If a vehicle driving in the right-side adjacent lane near the subject vehicle is recognized in step S30, the driving control unit 22 proceeds to step S31.

In step S31, the driving control unit 22 detects the velocity value of the identified vehicle in the right-side adjacent lane and judges whether the velocity value of the identified vehicle is substantially equal to the currently registered velocity value (namely, the current velocity) of the subject vehicle. In a manner similar to the velocity of the vehicle in the left-side adjacent lane, the velocity of the vehicle in the right-side adjacent lane can be determined by using a known technique based on the detection results of the surrounding environment recognition sensors 20a, such as millimetric wave radars, included in the surrounding monitor unit 20.

If the velocity value of the vehicle in the right-side adjacent lane is found to be substantially equal to the registered velocity value of the subject vehicle in step S31, the driving control unit 22 proceeds to step S32.

In step S32, the driving control unit 22 sets a new temporary velocity value which is lower than the currently registered velocity value by a preset value and then performs driving control by using the new temporary velocity value. This allows the subject vehicle to drive slower than the vehicle in the right-side adjacent lane. The subject vehicle is thus being separated backward from the vehicle in the right-side adjacent lane so as to increase the distance with this vehicle. The driving control unit 22 then returns to step S12 in FIG. 2.

In step S32, to set a new temporary velocity value, the registered velocity value is desirably reduced by a considerably large amount, such as about 20 to 30%.

If the driving control unit 22 reduces the registered velocity value by a considerable amount, a step of checking the presence of a vehicle behind the subject vehicle, such as step S16 in FIG. 2, may be added, though it is not illustrated in FIG. 4. If a vehicle approaching the subject vehicle from behind, for example, is detected, the driving control unit 22 executes suitable processing, such as reducing the registered velocity value by a smaller amount.

If it is found in step S31 that the velocity value of the vehicle in the right-side adjacent lane is not substantially equal to the registered velocity value of the subject vehicle, the driving control unit 22 continues performing control with the currently registered velocity value by skipping step S32 and returns to step S12 in FIG. 2.

If no vehicle driving in the right-side adjacent lane near the subject vehicle is identified in step S30, the driving control unit 22 proceeds to step S33.

In step S33, the driving control unit 22 checks how frequently a brake lamp of the leading vehicle ahead of the subject vehicle is ON. This processing is to check how frequently the brake lamp is repeatedly switched between ON and OFF. Usually, as the brake lamp of a vehicle is turned ON more frequently, this vehicle is likely to be driving in a more complicated manner, such as accelerating and decelerating suddenly.

Hence, the driving control apparatus 1 checks the ON state of the brake lamp of the leading vehicle in step S33. If the brake lamp of the leading vehicle is found to be frequently ON in step S33, the driving control unit 22 proceeds to step S32.

In step S32, the driving control unit 22 sets a new temporary velocity value which is lower than the currently registered velocity value by a preset value and then performs driving control by using the new temporary velocity value. The driving control unit 22 then returns to step S12 in FIG. 2.

In step S32, to set a new temporary velocity value, it is desirable that the registered velocity value be reduced by a larger amount as the brake lamp of the leading vehicle is turned ON more frequently.

If it is determined in step S33 that the frequency with which the brake lamp of the leading vehicle is turned ON is reasonably low, the driving control unit 22 proceeds to step S34.

In step S34, the driving control unit 22 checks the amount of change in the lateral position of the leading vehicle and determines whether the amount of change is higher than or equal to a predetermined threshold. A change in the lateral position of the leading vehicle indicates the behavior of the leading vehicle, such as zigzag driving. If the amount of change in the lateral position of the leading vehicle is higher than or equal to the predetermined threshold, the leading vehicle is likely to be driving recklessly.

Hence, the driving control apparatus 1 checks the amount of change in the lateral position of the leading vehicle in step S34, and if it is found to be greater than or equal to the predetermined threshold, the driving control unit 22 proceeds to step S32. The predetermined threshold is based on the width of the leading vehicle, for example, and if the leading vehicle repeatedly changes its lateral position by about half of the width or more, it can be determined that the leading vehicle is driving recklessly.

In step S32, the driving control unit 22 sets a new temporary velocity value which is lower than the currently registered velocity value by a preset value and then performs driving control by using the new temporary velocity value. The driving control unit 22 then returns to step S12 in FIG. 2.

In step S32, to set a new temporary velocity value, it is desirable that the registered velocity value be reduced by a larger amount as the amount of change in the lateral position of the leading vehicle is larger.

If it is determined in step S34 that the amount of change in the lateral position of the leading vehicle is small (or almost no change), the leading vehicle is assumed to be driving normally. The driving control unit 22 then proceeds to step S35.

In step S35, the driving control unit 22 checks the traffic congestion of the opposite lanes of the driving lane of the subject vehicle. A known technique is used to check the surrounding environments, such as the traffic congestion, based on image data obtained by the camera unit 21, for example.

If the opposite lanes are found to be congested in step S35, the driving control unit 22 proceeds to step S32. If the opposite lanes are not congested, the driving control unit 22 returns to step S12 in FIG. 2.

In step S32, the driving control unit 22 sets a new temporary velocity value which is lower than the currently registered velocity value by a preset value and then performs driving control by using the new temporary velocity value. The driving control unit 22 then returns to step S12 in FIG. 2.

As described above, the driving control unit 22 performs driving control in the following manner. In steps S27 through S32, the driving control unit 22 performs driving control by reflecting the presence of other vehicles driving in the left and right lanes next to the driving lane of the subject vehicle. In steps S33, S34, and S32, the driving control unit 22 performs driving control by taking the abnormal behavior of the leading vehicle into consideration. In steps S35 and S32, the driving control unit 22 performs driving control by considering the traffic congestion around the subject vehicle, such as in the opposite lanes.

Usually, when driving on a multi-lane road, a driver wishes to avoid driving along another vehicle in an adjacent lane for a long time. If the subject vehicle drives close to another vehicle for a long time, a dangerous situation, such as a collision, could happen at any time. It is thus desirable to avoid such a situation.

Basically, in the left-hand traffic road system, if a vehicle driving in a left-side lane overtakes a vehicle on a right-side lane (overtake lane), a smooth traffic flow may be disturbed.

From this point of view, in the driving control apparatus 1, in steps S27 through S29, if the subject vehicle is driving in a lane other than the leftmost lane and if another vehicle is driving in the left-side adjacent lane at a velocity substantially equal to the subject vehicle, the driving control unit 22 performs control to stop the subject vehicle from driving along the vehicle in the left-side adjacent lane. The driving control unit 22 switches from the velocity value registered in step S26 to the current driver set velocity value. This enables the subject vehicle to speed up and to separate forward from the vehicle in the left-side adjacent lane.

Figure 6:
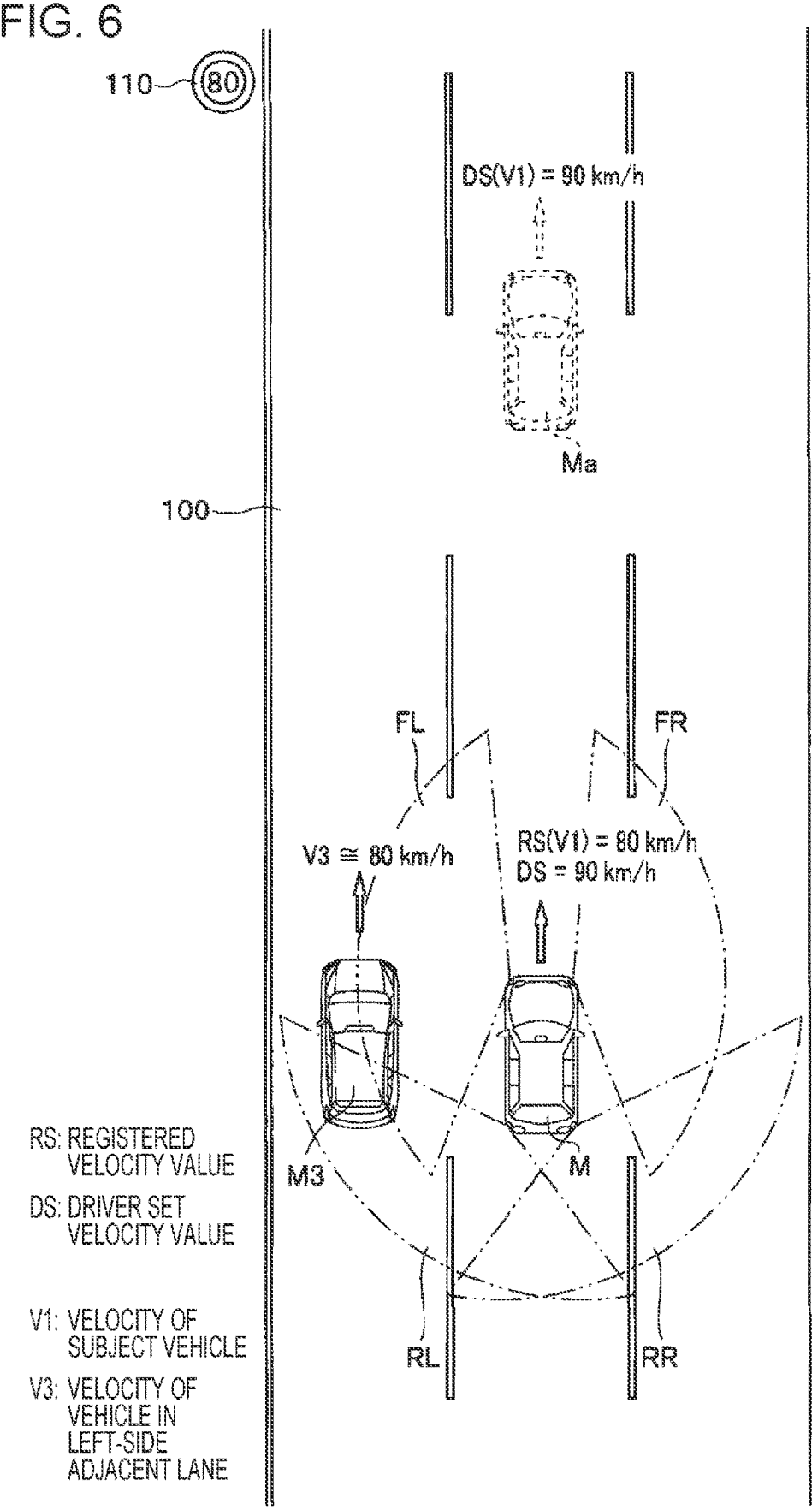
FIG. 6 is a conceptual view for explaining a processing sequence of steps S27 through S29 in FIG. 4 through illustration of an example.

FIG. 6 illustrates a situation where, while a subject vehicle is driving on a multi-lane road (three-lane road each way, for example) in the eco-ACC control mode, another vehicle driving in the left-side adjacent lane near the subject vehicle is identified. FIG. 6 is a conceptual view for explaining the processing sequence of steps S27 through S29 in FIG. 4 through illustration of an example.

In the situation illustrated in FIG. 6, it is assumed that the driving control apparatus 1 continues performing ACC control based on the velocity value registered in step S26 in FIG. 3 after executing the processing sequence illustrated in FIGS. 2 and 3.

In FIG. 6, a subject vehicle M having the driving control apparatus 1 of the embodiment mounted therein/thereon is illustrated. It is assumed that the subject vehicle M is driving on a road 100 while turning ON the driving control apparatus 1. The road 100 has three lanes each way. The opposite side of the road 100 is not illustrated in FIG. 6.

The subject vehicle M is driving in the center lane of the road 100. A speed limit sign 110 indicates that the speed limit of the road 100 is 80 km/h.

In the above-described situation, the subject vehicle M is driving under ACC control at a velocity value RS of 80 km/h registered in step S26. That is, the subject vehicle M is driving at a velocity V1 of 80 km/h. The driver set velocity value DS is 90 km/h.

At this time point, the subject vehicle M no longer recognizes a leading vehicle (NO in step S25 in FIG. 3). No vehicle is thus found ahead of the subject vehicle M. The vehicle designated by the broken lines Ma in FIG. 6 indicates the position of the subject vehicle M separated from another vehicle M3 driving in the left-side adjacent lane after the velocity of the subject vehicle M is raised to become higher than that of the vehicle M3 (switched from the registered velocity value RS to the driver set velocity value DS). This will be discussed later in detail.

While the subject vehicle M recognizes no leading vehicle, it identifies the vehicle M3 driving in the left-side adjacent lane near the subject vehicle M (YES in step S27 in FIG. 4). As discussed above, the vehicle M3 can be detected by the corresponding surrounding environment recognition sensor 20a included in the surrounding monitor unit 20, for example.

The long dashed double-dotted lines FR, FL, RR, and RL in FIG. 6 represent the viewable areas of the individual surrounding environment recognition sensors 20a. In one example, the range indicated by the long dashed double-dotted line FR represents the viewable area of the surrounding environment recognition sensor 20a disposed on the front right side of the subject vehicle M. Likewise, the range indicated by the long dashed double-dotted line FL represents the viewable area of the surrounding environment recognition sensor 20a disposed on the front left side of the subject vehicle M. The range indicated by the long dashed double-dotted line RR represents the viewable area of the surrounding environment recognition sensor 20a disposed on the rear right side of the subject vehicle M. The range indicated by the long dashed double-dotted line RL represents the viewable area of the surrounding environment recognition sensor 20a disposed on the rear left side of the subject vehicle M.

In the situation illustrated in FIG. 6, the subject vehicle M identifies the vehicle M3 driving in the left-side adjacent lane near the subject vehicle M by using the surrounding environment recognition sensor 20a disposed on the rear left side of the subject vehicle M. At this time, the subject vehicle M also detects the velocity V3 of the vehicle M3. The velocity V3 of the vehicle M3 is assumed to be substantially equal to the velocity V1 of the subject vehicle M (YES in step S28). The subject vehicle M is cruising at a registered velocity value RS of 80 km/h. Accordingly, the velocity V3 of the vehicle M3 in the left-side adjacent lane is also assumed to be about 80 km/h.

In this situation, to avoid driving along the vehicle M3 in the left-side adjacent lane, the driving control apparatus 1 of the subject vehicle M switches from the registered velocity value RS (80 km/h) to the driver set velocity value DS (90 km/h) (step S29). This allows the subject vehicle M to separate forward from the vehicle M3 in the left-side adjacent lane so as to gradually increase the distance with the vehicle M3. The position of the subject vehicle M in this state is indicated by the broken lines Ma in FIG. 6.

In steps S30 through S32, if the subject vehicle is driving in a lane other than the rightmost lane and if a vehicle driving in the right-side adjacent lane at a velocity substantially equal to that of the subject vehicle is detected, the driving control unit 22 performs control to stop the subject vehicle from driving along the vehicle in the right-side adjacent lane. The driving control unit 22 sets a new temporary velocity value which is lower than the velocity value registered in step S26 by a preset value and then performs driving control by using the new temporary velocity value. This enables the subject vehicle to separate backward from the vehicle in the right-side adjacent lane.

Figure 7:
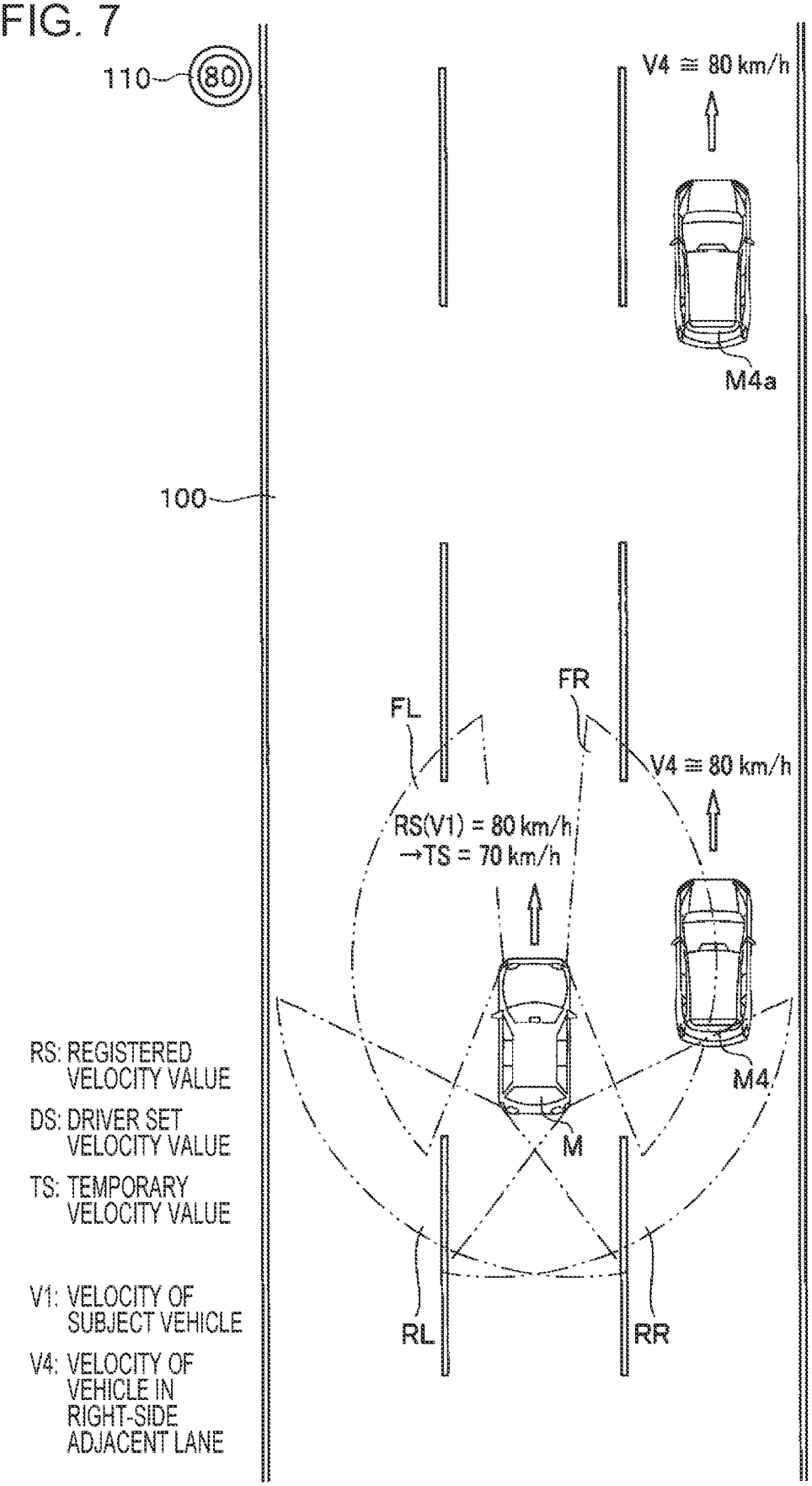
FIG. 7 is a conceptual view for explaining a processing sequence of steps S30 through S32 in FIG. 4 through illustration of an example.

FIG. 7 illustrates a situation where, while the subject vehicle is driving on a multi-lane road (three-lane road each way, for example) in the eco-ACC control mode, another vehicle driving in the right-side adjacent lane near the subject vehicle is identified. FIG. 7 is a conceptual view for explaining the processing sequence of steps S30 through S32 in FIG. 4 through illustration of an example.

The situation illustrated in FIG. 7 is similar to that in FIG. 6. Details of the situation only different from that in FIG. 6 will be discussed below while an explanation of the situation similar to that in FIG. 6 will be omitted.

As in the situation in FIG. 6, it is assumed that, in FIG. 7, the driving control apparatus 1 continues performing ACC control based on the velocity value registered in step S26 in FIG. 3 after executing the processing sequence illustrated in FIGS. 2 and 3.

The subject vehicle M is driving under ACC control at a velocity value RS of 80 km/h registered in step S26. That is, the subject vehicle M is driving at a velocity V1 of 80 km/h. The driver set velocity value DS is 90 km/h.

At this time point, no leading vehicle is detected ahead of the subject vehicle M in the center lane, as illustrated in FIG. 7.

The subject vehicle M identifies a vehicle M4 driving in the right-side adjacent lane near the subject vehicle M (YES in step S30 in FIG. 4). The vehicle M4 can be identified by the corresponding surrounding environment recognition sensor 20a of the surrounding monitor unit 20, as for the vehicle M3 in the left-side adjacent lane in FIG. 6.

In the situation illustrated in FIG. 7, the subject vehicle M identifies the vehicle M4 driving in the right-side adjacent lane near the subject vehicle M by using the surrounding environment recognition sensor 20a disposed on the front right side of the subject vehicle M. At this time, the subject vehicle M also detects the velocity V4 of the vehicle M4. The velocity V4 of the vehicle M4 is assumed to be substantially equal to the velocity V1 of the subject vehicle M (YES in step S31). The subject vehicle M is cruising at a registered velocity RS of 80 km/h. Accordingly, the velocity V4 of the vehicle M4 in the right-side adjacent lane is also assumed to be about 80 km/h.

In this situation, to avoid driving along the vehicle M4, the driving control apparatus 1 of the subject vehicle M sets a temporary velocity value TS (70 km/h) which is lower than the registered velocity value RS (80 km/h) by a preset value and performs driving control based on the new temporary velocity value TS (70 km/h) (step S32). This allows the subject vehicle M to separate backward from the vehicle M4 in the right-side adjacent lane so as to gradually increase the distance with the vehicle M4. The position of the vehicle M4 in this state is indicated by M4a in FIG. 7.

While the subject vehicle is driving by following the leading vehicle, if abnormal behavior of a leading vehicle is detected in each of steps S33 and S34 in FIG. 4, the driving control apparatus 1 causes the subject vehicle to decelerate and to separate from the leading vehicle.

Examples of the abnormal behavior of the leading vehicle are that the brake lamp is frequently ON (YES in step S33) and the amount of change in the lateral position of the leading vehicle is large (YES in step S34).

To deal with such abnormal behavior, the driving control apparatus 1 sets a new temporary velocity value which is lower than the velocity value registered in step S26 in FIG. 3 by a preset value and switches to driving control based on the new temporary velocity value. This allows the subject vehicle to separate from the leading vehicle backward.

In FIG. 5, the ON state of the brake lamp of the leading vehicle M2 is indicated by BL.

If the driving control apparatus 1 has detected that the subject vehicle is driving by following a leading vehicle and traffic congestion is occurring in the opposite lane of the driving lane of the subject vehicle in step S35, it causes the subject vehicle to decelerate and to stop following the leading vehicle and to drive with a reduced speed.

To deal with the traffic congestion, the driving control apparatus 1 sets a new temporary velocity value which is lower than the velocity value registered in step S26 in FIG. 3 by a preset value and switches to driving control based on the new temporary velocity value. This allows the subject vehicle to drive slow enough to stop at any time even if somebody runs out into the driving lane of the subject vehicle, thereby maintaining safe driving.

Figure 8:
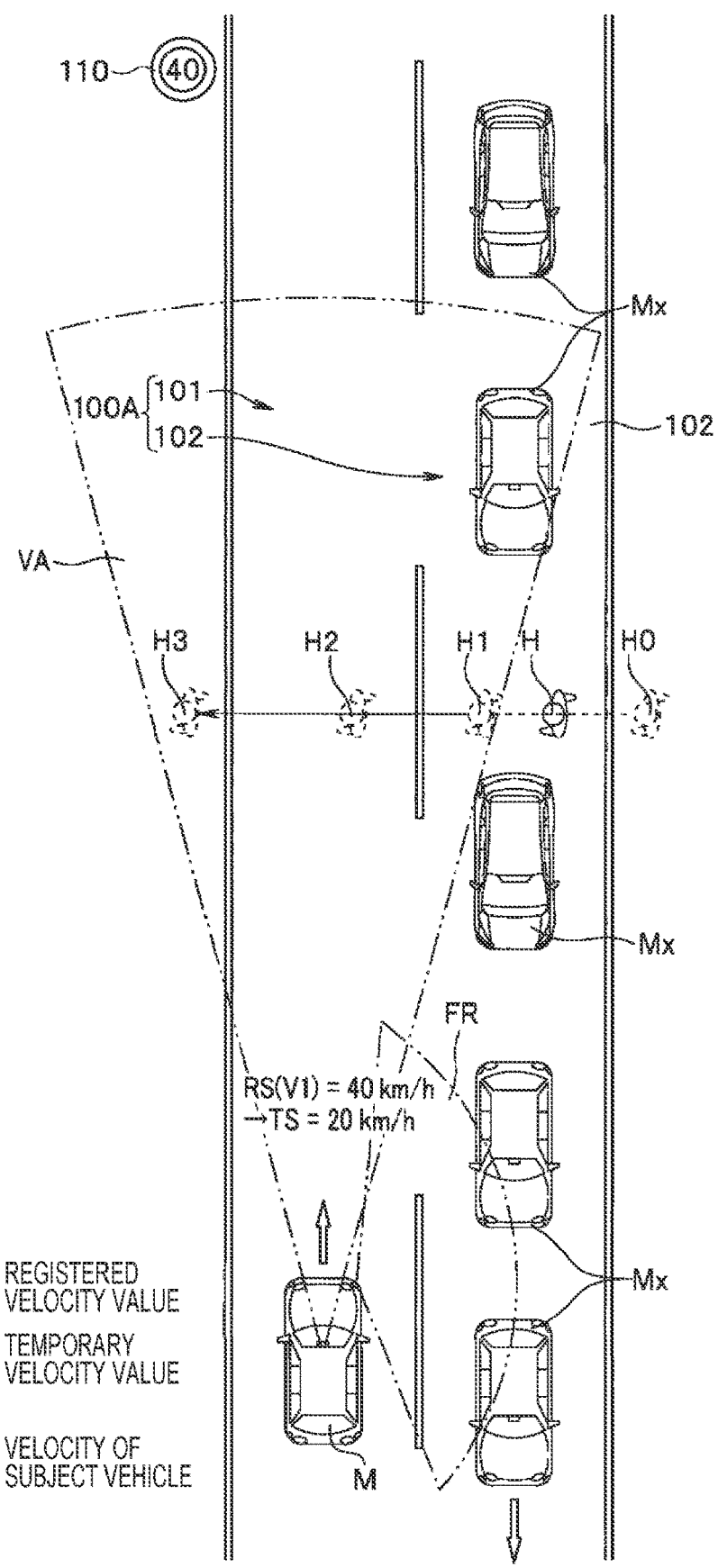
FIG. 8 is a conceptual view for explaining step S35 in FIG. 4 through illustration of an example.

FIG. 8 illustrates a situation where, while a subject vehicle is driving in a lane in the eco-ACC control mode, traffic congestion is occurring in the opposite lane. FIG. 8 is a conceptual view for explaining step S35 through illustration of an example.

It is not unusual to encounter a situation where, while traffic is running smoothly in one lane, there is a heavy traffic in the opposite lane. In such a situation, a pedestrian, for example, may slip between vehicles in the congested lane and try to cross the other lane where traffic is smooth. If a subject vehicle in the smooth traffic lane is driving at a relatively high speed, it may not be able to avoid such a pedestrian.

To deal with such a situation, in the driving control apparatus 1 of the embodiment, if the occurrence of traffic congestion is detected in the opposite lane, the velocity of the subject vehicle is considerably dropped so that the subject vehicle can stop at any time in case a pedestrian, for example, rushes out of the congested lane. That is, a new temporary velocity value of the subject vehicle is set. This enables the subject vehicle to avoid a pedestrian running out of the congested lane.

In the situation illustrated in FIG. 8, it is assumed that the driving control apparatus 1 continues performing ACC control based on the velocity value registered in step S26 in FIG. 3 after executing the processing sequence illustrated in FIGS. 2 and 3. This situation is similar to that in FIG. 6 or 7. However, the environment of the road of the subject vehicle in FIG. 8 is different from that in FIG. 6 or 7 in the following point.

In FIG. 8, as well as in FIGS. 6 and 7, a subject vehicle M having the driving control apparatus 1 mounted therein/thereon is illustrated. It is assumed that the subject vehicle M is driving on a road 100A while turning ON the driving control apparatus 1. The road 100A has a single lane each way. That is, the road 100A illustrated in FIG. 8 is a local road having lanes 101 and 102 parallel with each other. The subject vehicle M is driving in the lane 101. Oncoming vehicles are running in the lane 102, which is opposite the lane 101. A speed limit sign 110 indicates that the speed limit of the road 100A is 40 km/h. While the traffic is running relatively smoothly in the lane 101 of the subject vehicle M, multiple oncoming vehicles Mx are stuck in a line in the opposite lane 102.

In this situation, the subject vehicle M is driving under ACC control at a velocity value RS of 40 km/h registered in step S26 in FIG. 3. That is, the subject vehicle M is driving at a velocity V1 of 40 km/h.

At this time point, the subject vehicle M no longer recognizes a leading vehicle (NO in step S25 in FIG. 3). No vehicle is thus found ahead of the subject vehicle M, as illustrated in FIG. 6.

The subject vehicle M recognizes that the opposite lane 102 is congested (YES in step S35). The situation of the opposite lane 102 can be detected by a known technique using the camera unit 21 or the surrounding monitor unit 20, for example.

In such a situation, a pedestrian, for example, may run out between vehicles in the opposite lane 102. In the example in FIG. 8, a pedestrian (at the position indicated by H0) on the side of the opposite lane 102 of the road 100A passes through the line of the oncoming vehicles Mx (at the position indicated by H), crosses the opposite lane 102 (at the position indicated by H1), reaches the lane 101 (at the position indicated by H2), and finishes crossing the lane 101 (at the position indicated by H3).

In such a situation, while driving, the subject vehicle M is constantly monitoring the environment ahead with the camera unit 21, for example. In the above-described example, when the pedestrian is located at the position H, it is still unseen behind the line of the vehicles Mx in the opposite lane 102 and is also out of a viewable area VA of the camera unit 21 of the subject vehicle M. At this time point, the subject vehicle M is unable to recognize the pedestrian at the position H.

Then, the pedestrian moves and reaches the position H1. At this time point, the pedestrian enters the viewable area VA of the camera unit 21. If there is no obstacle that interrupts between the subject vehicle M and the pedestrian, the subject vehicle M is able to identify the pedestrian at the position H1.

However, while the pedestrian moves from the position H to the position H1, the subject vehicle M drives forward. At a time when the subject vehicle M recognizes the pedestrian, as the velocity V1 of the subject vehicle M is faster, the distance between the pedestrian and the subject vehicle M is becoming smaller. The subject vehicle M is more likely to fail to avoid the pedestrian and collide with it.

To avoid such a situation, the driving control apparatus 1 considerably drops the velocity V1 (40 km/h in the example in FIG. 8) of the subject vehicle M so that the subject vehicle M can stop at any time in case a pedestrian, for example, rushes out between vehicles in the congested opposite lane 102. That is, the driving control apparatus 1 sets a new temporary velocity value. In this case, the velocity V1 is lowered by about 50%. That is, the velocity V1 is dropped to about 20 km/h.

This enables the subject vehicle M to deal with an unexpected situation by urgently applying the brakes, for example, even if a pedestrian rushes out of the congested opposite lane 102.

In the driving control apparatus 1 of the embodiment, to detect the velocities (V2 to V4) of a leading vehicle, a following vehicle, and side vehicles in left- and right-side adjacent lanes, the absolute values of velocities (V2 to V4) are detected. However, this is only an example. To detect the velocity of a target vehicle, the relative velocity of the target vehicle to that of a subject vehicle may alternatively be detected.

A description has been given, assuming that the embodiment is applied to the left-hand traffic road system. In the embodiment, basically, a left-side adjacent lane is a driving lane, while a right-side adjacent lane is an overtake lane. When the embodiment is applied to the right-hand traffic road system, a left-side adjacent lane is assumed to be an overtake lane and a right-side adjacent lane is assumed to be a driving lane. That is, the embodiment for the left-hand traffic road system may be replaced to another embodiment for the right-hand traffic road system. In the other embodiment, the left-side adjacent lane at a side of the driving lane in the embodiment is replaced to the right-side adjacent lane, and the right-side adjacent lane at a side of the overtake lane in the embodiment is replaced to the left-side adjacent lane. The other embodiment, excluding the replacements of the left-side adjacent lane and the right-side adjacent lane, are identical to the embodiment.

In the above-described embodiment, the driving control apparatus 1 having an ACC control function is installed in/on a vehicle and executes the following control while performing ACC control with a driver set vehicle velocity, which is set by a driver. When the following conditions are satisfied; a leading vehicle is detected ahead of the subject vehicle; the velocity of the subject vehicle exceeds the speed limit of a driving road; a currently registered velocity value (driver set velocity value) is higher than or equal to the velocity value of the leading vehicle; and a vehicle following the subject vehicle has not been detected for a predetermined time or longer, the driving control apparatus 1 sets a temporary velocity value which is lower than the velocity of the leading vehicle and performs control based on the new temporary velocity value. The temporary velocity value is set in a range from a preset speed-limit-based value, which is based on the speed limit of the driving road of the subject vehicle, as the lower limit value to the driver set vehicle velocity, as the upper limit value.

With this control operation, the driving control apparatus 1 can considerably increase the distance between the subject vehicle and the leading vehicle. Since the absence of a following vehicle is ensured, the subject vehicle is able to continue driving almost alone at a constant set velocity. The subject vehicle can thus avoid being close to both of the leading vehicle and a following vehicle, thereby making it possible to maintain safe driving.

The driving control apparatus 1 performs control to separate the subject vehicle from the leading vehicle by lowering the velocity of the subject vehicle without disturbing a smooth traffic flow. This enables the subject vehicle to maintain stable driving at a constant set velocity without being influenced by the behavior of the leading vehicle. This also allows the subject vehicle to avoid accelerating and decelerating frequently, which would be caused by the unexpected behavior of the leading vehicle, thereby achieving good ride comfort and safe driving. It is also possible to maintain stable driving with a reduced velocity so as to contribute to improving the fuel consumption rate.

Additionally, if a vehicle driving in a left- or right-side adjacent lane near the subject vehicle is detected, the driving control apparatus 1 controls the velocity of the subject vehicle so as to allow it to avoid driving along the detected vehicle. That is, the driving control apparatus 1 makes the subject vehicle drive faster than a vehicle in a driving lane and drive slower than a vehicle in an overtake lane. This can avoid a situation where the subject vehicle drives close to another vehicle, thereby enabling the subject vehicle to drive safely.

In the above-described embodiment, one of the conditions for setting a temporary velocity value, which is lower than the velocity of a leading vehicle, is that the velocity value of the subject vehicle exceeds the speed limit of the driving road of the subject vehicle. Instead of this condition, a certain value based on the speed limit (may be higher or lower than the speed limit) may be set, and the condition that the velocity value of the subject vehicle exceeds such a preset value may be used. That is, a certain allowance may be given to the speed limit. It is thus desirable that, if the velocity of the subject vehicle is the same as the speed limit or is slightly lower than the speed limit (for example, the velocity of the subject vehicle is lower than the speed limit only by 1 km/h), the driving control apparatus 1 still perform the above-described control operation.

The disclosure is not limited to the above-described embodiment and various modifications, variations, and applications may be made without departing from the spirit and scope of the disclosure. For example, some of the elements disclosed in the embodiment may be omitted suitably, and elements in different embodiments may be combined suitably. It is intended that the scope of the disclosure be defined by the following claims and their equivalents.

According to an embodiment of the disclosure, it is possible to provide a driving control apparatus that can offer good ride comfort and also contribute to improving the fuel consumption rate and to maintaining safe driving while performing control for a vehicle by considering surrounding other vehicles.

The map locator calculator 12, the surrounding environment recognizer 20b, the driving environment recognizer 21d, the driving control unit 22, the engine control unit 23, the power steering control unit 24, and the brake control unit 25 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the map locator calculator 12, the surrounding environment recognizer 20b, the driving environment recognizer 21d, the driving control unit 22, the engine control unit 23, the power steering control unit 24, and the brake control unit 25. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle driving control apparatus to be applied to a vehicle, the vehicle driving control apparatus comprising:
a surrounding environment information obtaining device configured to obtain surrounding environment information on an environment around the vehicle;
a vehicle situation information obtaining device configured to obtain vehicle situation information on a situation of the vehicle;
an external information receiving device configured to receive at least roadmap information from an external device;
a velocity value setter configured to set a target velocity value of the vehicle to be used for performing driving control; and
a driving control unit configured to
adjust a velocity value of the vehicle by considering one or more surrounding vehicles around the vehicle, based on a plurality of items of information including the surrounding environment information obtained by the surrounding environment information obtaining device, the vehicle situation information obtained by the vehicle situation information obtaining device, and the roadmap information obtained by the external information receiving device, and
perform driving control based on the adjusted velocity value of the vehicle, wherein
in a case where:
a leading vehicle ahead of the vehicle is recognized;
the velocity value of the vehicle exceeds a speed limit value of a driving road of the vehicle or a predetermined velocity value, the predetermined velocity value being determined by adding or subtracting a certain value to or from the speed limit value;
a driver set velocity value set by a driver who drives the vehicle is higher than or equal to a velocity value of the leading vehicle; and
a following vehicle behind the vehicle has not been recognized for a predetermined time or longer,
the driving control unit is configured to set a temporary velocity value as the velocity value of the vehicle and to perform driving control by using the temporary velocity value, the temporary velocity value being lower than the velocity value of the leading vehicle by a preset value.

2. The vehicle driving control apparatus according to claim 1, wherein, in a case where the leading vehicle is no longer recognized while the driving control unit is performing driving control by using the temporary velocity value, the temporary velocity value is registered as a registered velocity value and the driving control unit continuously performs driving control by using the registered velocity value.

3. The vehicle driving control apparatus according to claim 1, wherein, in a case where the temporary velocity value is found to be lower than the predetermined velocity value based on the speed limit value, the predetermined velocity value is set as a new temporary velocity value.

4. The vehicle driving control apparatus according to claim 1, wherein, in a case where the temporary velocity value is found to exceed the driver set velocity value while the driving control unit is performing driving control by using the temporary velocity value, the driver set velocity value is registered as a new temporary velocity value.

5. The vehicle driving control apparatus according to claim 2, wherein, in a case where a different vehicle driving near the vehicle is recognized in either one of a left-side adjacent lane and a right-side adjacent lane while the driving control unit is performing driving control by using the registered velocity value and a velocity value of the different vehicle is found to be substantially equal to the velocity value of the vehicle, when the different vehicle is driving in a driving lane, the driving control unit switches from driving control using the registered velocity value to driving control using the driver set velocity value, and when the different vehicle is driving in an overtake lane, the driving control unit sets a new temporary velocity value and switches from driving control using the registered velocity value to driving control using the new temporary velocity value, the new temporary velocity value being lower than the registered velocity value by a preset value.

6. A vehicle driving control apparatus to be applied to a vehicle, the vehicle driving control apparatus comprising:
- a first sensor configured to obtain surrounding environment information on an environment around the vehicle, the vehicle;
- a second sensor configured to obtain vehicle situation information on a situation of the vehicle;
- circuitry configured to
  - receive at least roadmap information from an external device,
  - set a target velocity value of the vehicle to be used for performing driving control,
  - adjust a velocity value of the vehicle by considering one or more surrounding vehicles around the vehicle, based on a plurality of items of information including the surrounding environment information, the vehicle situation information, and the roadmap information, and
  - perform driving control based on the adjusted velocity value of the vehicle, wherein
- in a case where:
  - a leading vehicle ahead of the vehicle is recognized;
  - the velocity value of the vehicle exceeds a speed limit value of a driving road of the vehicle or a predetermined velocity value, the predetermined velocity value being determined by adding or subtracting a certain value to or from the speed limit value;
  - a driver set velocity value set by a driver who drives the vehicle is higher than or equal to a velocity value of the leading vehicle; and
  - a following vehicle behind the vehicle has not been recognized for a predetermined time or longer,
- the circuitry is configured to set a temporary velocity value as the velocity value of the vehicle and perform driving control by using the temporary velocity value, the temporary velocity value being lower than the velocity value of the leading vehicle by a preset value.

* * * * *